(12) United States Patent
Moon et al.

(10) Patent No.: US 11,343,577 B2
(45) Date of Patent: May 24, 2022

(54) ELECTRONIC DEVICE AND METHOD OF PROVIDING CONTENT THEREFOR

(71) Applicant: Samsung Electronics Co., Ltd., Gyeonggi-do (KR)

(72) Inventors: Jongbo Moon, Gyeonggi-do (KR); Sanglae Kim, Gyeonggi-do (KR); Jeehae Kim, Gyeonggi-do (KR); Haksoo Kim, Gyeonggi-do (KR); Moonsung Na, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/748,958

(22) Filed: Jan. 22, 2020

(65) Prior Publication Data

US 2020/0236441 A1 Jul. 23, 2020

(30) Foreign Application Priority Data

Jan. 22, 2019 (KR) .......................... 10-2019-0008131

(51) Int. Cl.
*H04N 7/16* (2011.01)
*H04N 21/472* (2011.01)

(52) U.S. Cl.
CPC . *H04N 21/47217* (2013.01); *H04N 21/47205* (2013.01)

(58) Field of Classification Search
CPC .......... H04N 21/4314; H04N 21/4312; H04N 21/44028; H04N 21/43615; H04N 21/8549; H04N 21/47205; H04N 21/2743
(Continued)

(56) References Cited

U.S. PATENT DOCUMENTS 5,579,239 A 11/1996 Freeman et al.
5,684,716 A 11/1997 Freeman
(Continued)

FOREIGN PATENT DOCUMENTS

EP 2 961 172 A1 12/2015
JP 2007-234090 A 9/2007
(Continued)

OTHER PUBLICATIONS

International Search Report dated May 8, 2020.

*Primary Examiner* — Jivka A Rabovianski
(74) *Attorney, Agent, or Firm* — Cha & Reiter, LLC

(57) ABSTRACT

Disclosed are an electronic device and a method of providing content. The electronic device may include: a display, a processor, and a memory. The processor implements the method, including: while playing, on a display, at least one three-dimensional (3D) moving image, detecting selections of a plurality of sections from the at least one 3D moving image; storing each of the selected sections as bookmark in a memory; displaying the stored bookmarks on the display; and in response to detecting selection, by input circuitry, of at least two bookmarks from among the displayed bookmarks, generate a link content that includes the at least two selected bookmarks, wherein each of the bookmarks comprises metadata indicating additional information on each of the selected sections, and viewpoint information indicating a viewing angle for each of the selected sections within the at least one 3D moving image.

20 Claims, 33 Drawing Sheets

(58) Field of Classification Search
USPC .................................... 725/13, 19, 62, 133
See application file for complete search history.

(56) References Cited

U.S. PATENT DOCUMENTS

| | | | |
|---|---|---|---|
| 6,396,500 B1 | 5/2002 | Qureshi et al. | |
| 6,608,563 B2 | 8/2003 | Weston et al. | |
| 7,143,353 B2 | 11/2006 | McGee et al. | |
| 7,509,687 B2 | 3/2009 | Ofek et al. | |
| 7,782,363 B2 | 8/2010 | Ortiz | |
| 8,184,169 B2 | 5/2012 | Ortiz | |
| 8,342,929 B2 | 1/2013 | Briggs et al. | |
| 8,585,479 B2 | 11/2013 | Ryan et al. | |
| 8,612,623 B2 | 12/2013 | Bland | |
| 8,719,090 B2 | 5/2014 | Lewis | |
| 8,774,562 B2 | 7/2014 | Daisy | |
| 8,775,792 B2 | 7/2014 | Davies, Sr. et al. | |
| 8,954,853 B2 | 2/2015 | Lacaze et al. | |
| 9,078,049 B2 | 7/2015 | Bland | |
| 10,186,300 B2 | 1/2019 | Ju et al. | |
| 10,356,387 B1* | 7/2019 | Phillips | H04N 7/18 |
| 2002/0008622 A1 | 1/2002 | Weston et al. | |
| 2003/0120183 A1 | 6/2003 | Simmons | |
| 2003/0158796 A1 | 8/2003 | Balent | |
| 2004/0230797 A1 | 11/2004 | Ofek et al. | |
| 2005/0144641 A1 | 6/2005 | Lewis | |
| 2005/0193341 A1 | 9/2005 | Hayward et al. | |
| 2007/0054738 A1 | 3/2007 | Muir | |
| 2007/0061076 A1 | 3/2007 | Shulman | |
| 2007/0242225 A1 | 10/2007 | Bragg et al. | |
| 2009/0034725 A1 | 2/2009 | Davies, Sr. et al. | |
| 2009/0037387 A1 | 2/2009 | Kim | |
| 2010/0128139 A1 | 5/2010 | Kim et al. | |
| 2010/0289900 A1 | 11/2010 | Ortiz | |
| 2011/0013884 A1 | 1/2011 | Sasaki et al. | |
| 2011/0293241 A1 | 12/2011 | Umeyama | |
| 2011/0307491 A1 | 12/2011 | Fisk | |
| 2012/0017153 A1 | 1/2012 | Matsuda et al. | |
| 2012/0030699 A1 | 2/2012 | Amin | |
| 2012/0066289 A1 | 3/2012 | Bland | |
| 2012/0066768 A1 | 3/2012 | Bland | |
| 2012/0139940 A1 | 6/2012 | Chavanne | |
| 2012/0296739 A1 | 11/2012 | Cassidy et al. | |
| 2013/0116020 A1 | 5/2013 | Barney et al. | |
| 2013/0116051 A1 | 5/2013 | Barney et al. | |
| 2013/0125000 A1* | 5/2013 | Fleischhauer | H04N 21/47205 715/723 |
| 2013/0166382 A1 | 6/2013 | Cassidy et al. | |
| 2014/0068439 A1 | 3/2014 | Lacaze et al. | |
| 2014/0176337 A1 | 6/2014 | Valin et al. | |
| 2014/0245463 A1 | 8/2014 | Suryanarayanan et al. | |
| 2014/0270701 A1 | 9/2014 | Raniere | |
| 2015/0118670 A1 | 4/2015 | Jespersen et al. | |
| 2015/0135301 A1 | 5/2015 | Davies, Sr. et al. | |
| 2015/0278606 A1* | 10/2015 | Laksono | G06F 16/7837 382/103 |
| 2015/0382077 A1 | 12/2015 | Liu et al. | |
| 2016/0066053 A1 | 3/2016 | Bielman et al. | |
| 2016/0073013 A1* | 3/2016 | Prosserman | H04N 21/42219 348/588 |
| 2016/0249085 A1 | 8/2016 | Ben-Atiya et al. | |
| 2016/0253911 A1 | 9/2016 | Jespersen et al. | |
| 2016/0287979 A1 | 10/2016 | Akavia et al. | |
| 2017/0171627 A1 | 6/2017 | Cang | |
| 2017/0286993 A1* | 10/2017 | Khalid | G06T 19/006 |
| 2018/0052595 A1* | 2/2018 | Parmar | G06F 3/04815 |

FOREIGN PATENT DOCUMENTS

| | | |
|---|---|---|
| KR | 10-1027155 B1 | 4/2011 |
| KR | 10-2012-0050689 A | 5/2012 |
| KR | 10-2015-0089466 A | 8/2015 |
| KR | 10-1705595 B1 | 2/2017 |
| KR | 10-2018-0053221 A | 5/2018 |
| KR | 10-2018-0136265 A | 12/2018 |

* cited by examiner

ELECTRONIC DEVICE AND METHOD OF PROVIDING CONTENT THEREFOR

CROSS-REFERENCE TO RELATED APPLICATION(S)

This application is based on and claims priority under 35 U.S.C. 119 to Korean Patent Application No. 10-2019-0008131, filed on Jan. 22, 2019, in the Korean Intellectual Property Office, the disclosure of which is herein incorporated by reference in its entirety.

BACKGROUND

1) Field

The disclosure relates to an electronic device and a method of providing content therefor.

2) Description of Related Art

Electronic devices (such as, for example, mobile terminals, smartphones, or wearable devices) may provide a wide variety of functions. For example, smart phones may provide not only a basic voice call function, but also a short-range wireless communication (such as, for example, Bluetooth, Wi-Fi, or Near Field Communication "NFC"), mobile communications (such as 3rd, $4^{th}$ and $5^{th}$ generation communication—3G, 4G, or 5G), multimedia playback, media capture (such as photograph), and/or navigational aide (such as location triangulation, map display and route-guidance).

As electronic devices now commonly include high quality cameras, more and more users utilize their devices to capture and share photographs over digital media. Further, as communication technology has improved, users now access more streaming media than ever before.

The above information is presented as background information only to assist with an understanding of the disclosure. No determination has been made, and no assertion is made, as to whether any of the above might be applicable as prior art with regard to the disclosure.

SUMMARY

Content providers, such as streaming services, typically provide visual media such as video as a "stream" or series of images. Sometimes, a user desires to watch only a specific scene within a media program (e.g., such as a portion of a soccer-game in which a player scores a goal). In order to access the desired scene, the current streaming paradigm produces an inconvenience in that the user is forced to stream a plurality of images in the streaming broadcast in order to find the desired scene. Alternatively, a user may be required to "cut" the desired scene (e.g., as files) out of the total plurality of images of the stream, and combine the cut files to generate new content limited to the desired portion of the stream. Furthermore, the content provider may be forced to provide additional storage space for storing the user's generated content.

Certain embodiments of the disclosure may provide a new content (e.g., moving image) by linking information (for example, reproduction address information or section information) on some sections (or scenes) of a plurality of contents or some sections of one content.

Certain embodiments of the disclosure may provide a search service in units of some sections (or scenes) of the content rather than in units of files.

In accordance with an aspect of the disclosure, an electronic device is provided. The electronic device includes: a display, a processor operatively connected to the display, a memory operatively connected to the processor, wherein the memory stores instructions executable by the processor to cause the electronic device to: while playing at least one three-dimensional (3D) moving image, detect selections of a plurality of sections from the at least one 3D moving image, store each of the selected sections as bookmark in the memory, display the stored bookmarks on the display, and in response to detecting selection of at least two bookmarks from among the displayed bookmarks, generate a link content that includes the at least two selected bookmarks, wherein each of the bookmarks comprises metadata indicating additional information on each of the selected sections, and viewpoint information indicating a viewing angle for each of the selected sections within the at least one 3D moving image.

In accordance with another aspect of the disclosure, an electronic device is provided. The electronic device includes: a display, a processor operatively connected to the display, a memory operatively connected to the processor, wherein the memory stores instructions executable by the processor to cause the electronic device to: store, in the memory, a link content including at least two bookmarks, each bookmark indicating a respective section of at least one three-dimensional (3D) moving image, each bookmark further including additional information including a viewing angle for the respective section of the at least one 3D moving image, receive a request to initiate playback of the link content, in response to the request, extract a first viewing angle related to a first direction from a first bookmark of the at least two bookmarks included in the link content, and execute the playback of the link content by setting the extracted first viewing angle as an initial viewing angle and playing a first section indicated by the first bookmark. In accordance with another aspect of the disclosure, a method of providing content by an electronic device is provided. The method includes: while playing, on a display, at least one three-dimensional (3D) moving image, detecting selections of a plurality of sections from the at least one 3D moving image; storing each of the selected sections as bookmark in a memory; displaying the stored bookmarks on the display; and in response to detecting selection, by input circuitry, of at least two bookmarks from among the displayed bookmarks, generate a link content that includes the at least two selected bookmarks, wherein each of the bookmarks comprises metadata indicating additional information on each of the selected sections, and viewpoint information indicating a viewing angle for each of the selected sections within the at least one 3D moving image.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
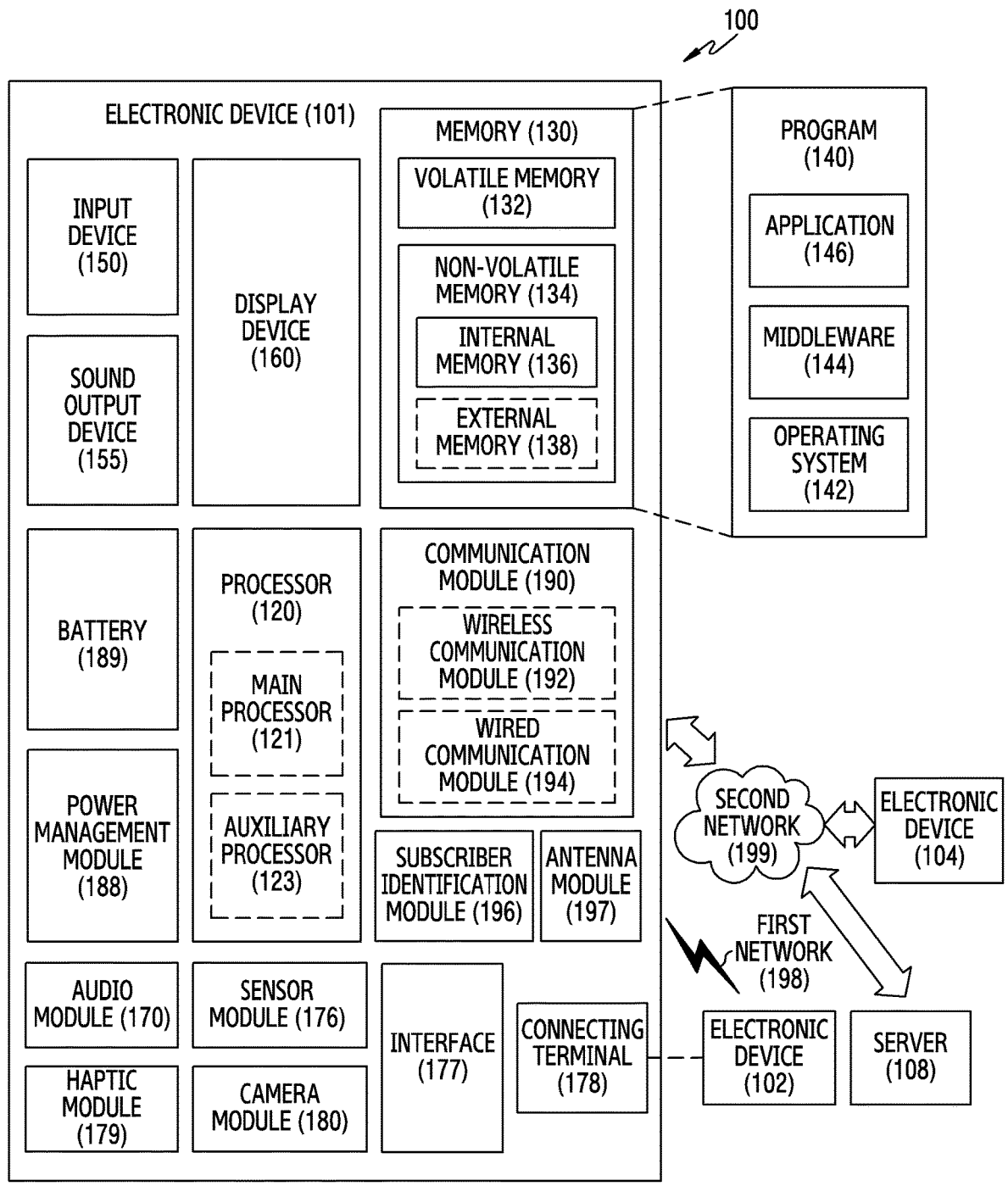
FIG. 1 is a block diagram illustrating an electronic device within a network environment according to an embodiment of the disclosure.

Hereinafter, certain embodiments of the disclosure will be described with reference to the accompanying drawings.

Although particular embodiments of the disclosure are illustrated in the drawings and described in the relevant detailed description, these embodiments are not intended to limit certain embodiments of the disclosure to specific forms. For example, it will be apparent to those skilled in the art that the embodiments of the disclosure may be modified and changed in various ways.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
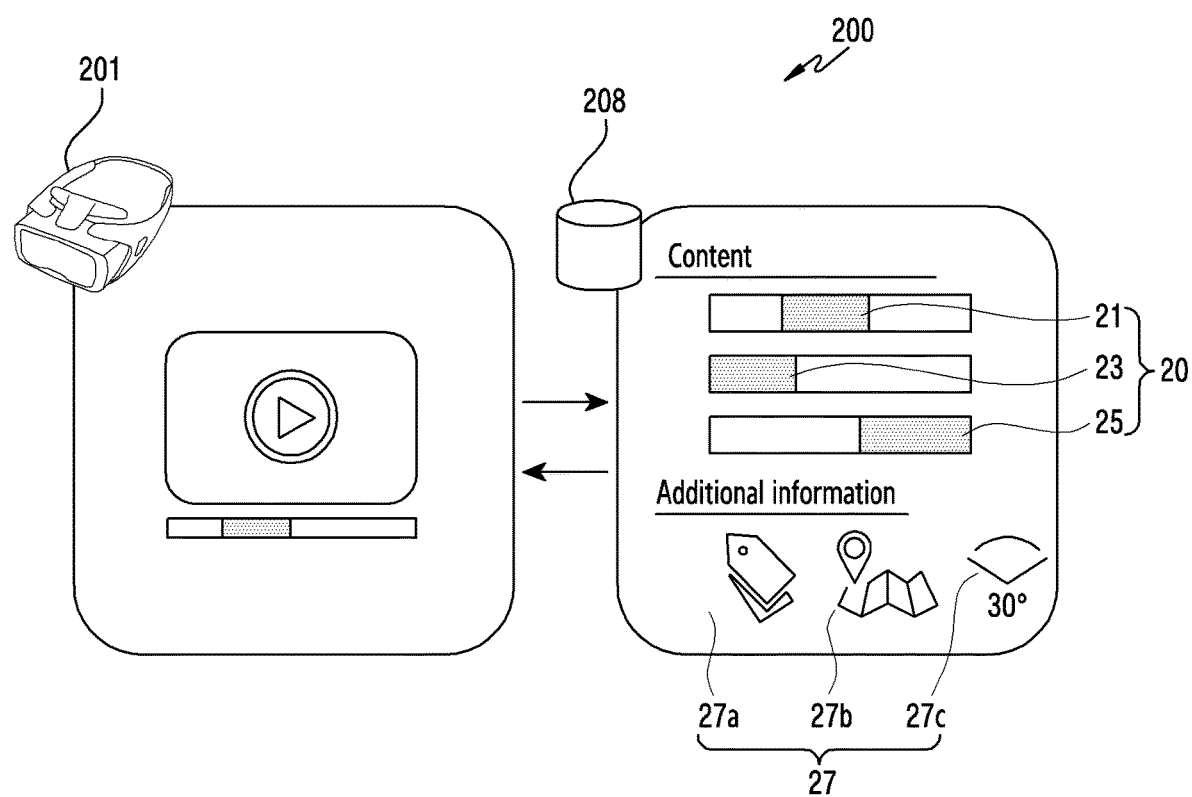
FIG. 2 illustrates a content provision system according to an embodiment of the disclosure.

FIG. 2 illustrates a content provision system according to an embodiment of the disclosure.

Referring to FIG. 2, a system 200 according to an embodiment of the disclosure may include an electronic device 201 (such as, for example, the electronic device 101) and a server 208 (such as, for example, the server 108).

The server 208, according to an embodiment of the disclosure, may store at least one piece of content and additional information 27. The content may be a media file including, for example "moving image" data (e.g., video) captured using various image devices (such as, for example, a smartphone, a drone, a 360-degree camera, or a video camera). The moving image may be a two-dimensional (2D) or a three-dimensional (3D) moving image. The additional information 27 (e.g., metadata associated with the media) may include, for example, tag information 27*a*, location information 27*b*, or viewpoint information 27*c*.

The server 208 may be a cloud server supporting a streaming service that streams deliver multimedia content to users.

The electronic device 201, according to an embodiment of the disclosure, may be an image reproduction device, such as a virtual reality device or an augmented reality device, such as the head-mounted device (HMD) depicted in FIG. 2. According to an embodiment, the electronic device 201 may be an image reproduction device such as a smartphone, a table Personal Computer (PC), a desktop PC, or a laptop PC. In some embodiments, a portable electronic device may be combined with a head-mounted unit to provide the HMD functionality. For example, the electronic device 201 may access the server 208 according to a request from a user and reproduce or edit (delete or change a storage location) various pieces of content stored in the server 208. Alternatively, the electronic device 201 may access the server 208 according to a request from the user and upload content to the server 208.

The electronic device 201 according to an embodiment of the disclosure may support the bookmarking of designated sections 21, 22, and 23 of at least one piece of streaming media content. The bookmarks may be stored the same in the server 208, which may further support generation of new content 20 (e.g., hereinafter, link content) including bookmarked sections thereof, and/or a reproduction of linked content. The electronic device 201 may receive inputs of additional information (e.g., metadata), such as for example, tag information 27*a*, location information 27*b*, and/or viewpoint information 27*c* when a bookmark is generated. Tag information may refer to text labels attached to media as metadata thereof, which may be used to describe objects, categories, and other descriptors of a particular image or movie (e.g., "Eiffel Tower," "Paris," "Tour" for one or more images captured during a vacation in Paris. Location information may refer to actual location-identifying information, such as a textual designator, positioning coordinate, etc. Lastly, viewpoint information may indicate a field-of-view or viewing angle of a user within, for example, a 3D media presentation, or a VR/AR environment. A detailed description thereof will be given below.

Figure 3:
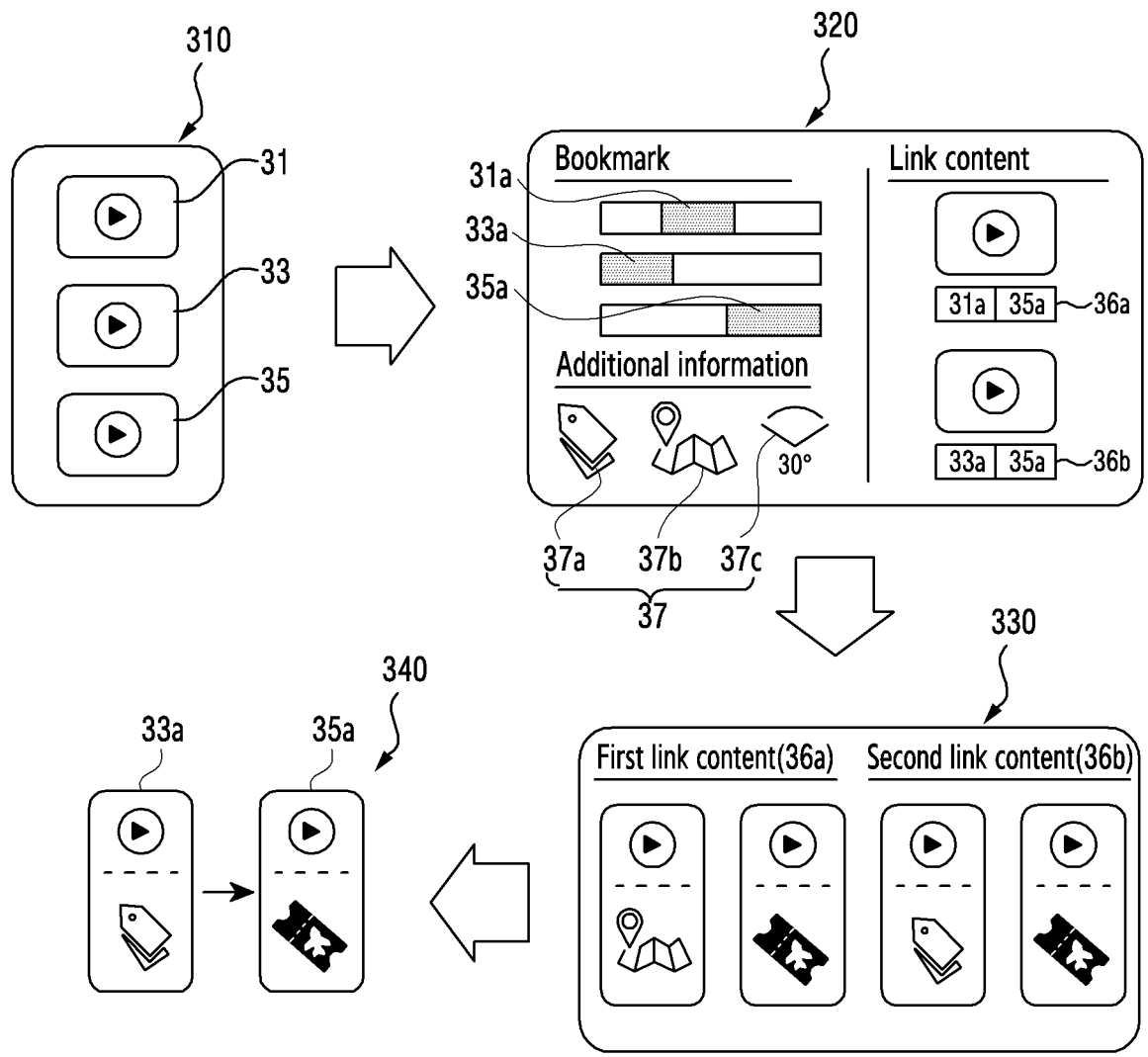
FIG. 3 illustrates a content provision method according to an embodiment of the disclosure.

FIG. 3 schematically illustrates a method of providing content according to an embodiment of the disclosure.

Referring to FIG. 3, an electronic device (for example, the electronic device 101 or the electronic device 201), according to an embodiment of the disclosure, may reproduce at least one piece of content 31, 33, or 35 as indicated by reference numeral 310. For example, the electronic device may access a server (for example, the server 108 or the server 208) and reproduce at least one piece of content 31, 33, or 35 selected by the user among a plurality of pieces of content stored in the server. According to an embodiment, the electronic device may receive at least one piece of content 31, 33, or 35 from the server in a streaming manner and reproduce the same.

As indicated by reference numeral 310 of FIG. 3, multiple streams of content 31, 33, or 35 may be simultaneously reproduced. However, in other embodiments or according to user preference, the playback of a stream may be limited to one of the three content streams 31, 33, or 35 at a time, according to a request from the user. According to an embodiment of FIG. 3, the electronic device may simultaneously reproduce a plurality of pieces of content through multiple windows.

The electronic device may enabling bookmarking or sections of the reproduced content, based on a user request to set the bookmark within the content stream. For example, the electronic device may bookmark a section (hereinafter, referred to as a first section) of first content with a first bookmark 31*a*, a section (hereinafter, referred to as a second section) of second content 33 with a second bookmark 33*a*, and a section (hereinafter, referred to as a third section) of third content 35 with a third bookmark 35*a*, as summarized under reference numeral 320. When bookmarking the first section, the second section, or the third section, the electronic device may also store additional information input by the user, or information that is automatically extracted. The additional information 37 (e.g., metadata) may include tag information 37a, location information 37b, and/or viewpoint information 37c. A detailed description of the additional information 37 will be made below.

The electronic device may generate at least one piece of "link content" by connecting (linking, combining) at least two stored bookmarks. For example, as indicated by reference numeral 320, the electronic device may connect a first bookmark 31a and a third bookmark 35a to generate the first link content 36a. The first link content 36a may be generated when the first bookmark 31a and the third bookmark 35a are selected by the user, from among a plurality of stored bookmarks. Similarly, detecting selection of the second bookmark 33a and the third bookmark 35a may result in generation of the second link content 36b.

The first link content 36a and the second link content 36b may be generated by linking information on some bookmarked sections (for example, reproduction address information, section information, tag information, or viewpoint (e.g., field-of-view or viewing angle information in a 3D or 360 degree image and/or virtual or augmented reality context). A detailed description thereof will be made below.

The electronic device may display a link content list in response to a user request (e.g., selection of a folder of the link content) as indicated by reference numeral 330.

When specific link content is selected from the link content list, the electronic device may sequentially reproduce the bookmarked portions of the media streams included in the selected link content. For example, the electronic device may reproduce the second section of the second content 33 included in the second link content 36b, and when reproduction of the second section is completed, reproduce the third section of the third content 35 as indicated by reference numeral 340. A method of reproducing the link content will be described below with reference to FIGS. 4 to 6.

Figure 4:
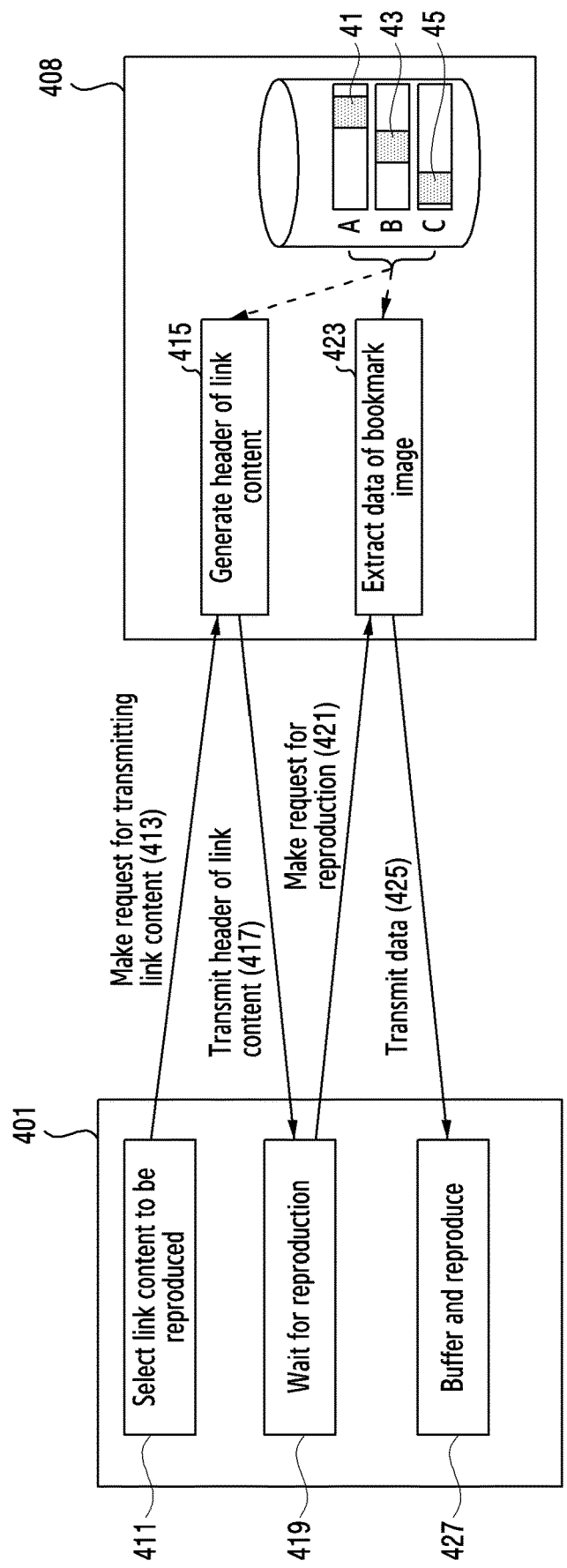
FIG. 4 illustrates a content reproduction method according to an embodiment of the disclosure.

FIG. 4 illustrates a content reproduction method according to an embodiment of the disclosure.

Referring to FIG. 4, an electronic device 401 (for example, the electronic device 101 or the electronic device 201) according to an embodiment of the disclosure may detect selection of link content to be reproduced in operation 411. For example, the electronic device 401 may access a server 408 (for example, the server 108 or the server 208) and select specific link content from the received link content list or detect selection of specific link content on a search screen. The selection may be detected through a touch input, a voice input, a button (key) input, eye gaze recognition, or specific gesture recognition.

When selection of the link content is detected, the electronic device 401 may generate a request for transmitting the selected link content to the server 408 in operation 413.

The server 408 receiving the request for transmitting the link content may generate a header of the link content in operation 415. For example, the server 408 may generate (or update) the header of the link content by merging information (for example, reproduction address information, section information, tag information, or viewpoint information) on bookmark images 41, 43, and 45 included in the link content. The header of the link content may be generated when the link content is generated and may be stored in the server 408. Thereafter, since the specific content included in the link content may be deleted, the server 408 may identify whether some of content (content A, content B, and content C) corresponding to the bookmark images 41, 43, and 45 included in the link content is deleted when the request for transmitting the link content is received. For example, when content "B" is deleted, the server 408 may generate the header of the link content to include information on some sections of content "A" and content "C".

According to some embodiments, it may be identified whether all pieces of content included in the link content exist and, when all pieces of content exist, the header of the previously stored link content may be transmitted to the electronic device 401.

The server 408 according to an embodiment of the disclosure may transmit the generated header of the link content to the electronic device 401 in operation 417.

The electronic device 401 according to an embodiment of the disclosure may enter a reproduction standby state in operation 419, and transmit a reproduction request to the server 408 in operation 421. For example, the electronic device 401 may transmit the reproduction request to the server 408 in response to detection of a reproduction command (for example, a touch input of a play button).

The server 408 according to an embodiment of the disclosure may extract data corresponding to the bookmarked images 41, 43, and 45 included in the link content of which reproduction is requested in operation 423 and transmit (e.g., stream) the extracted data to the electronic device 401 in operation 425. For example, the server 408 may sequentially transmit data corresponding to the first bookmark image 41, the second bookmark image 43, and the third bookmark image 45 to the electronic device 401.

The electronic device 401 according to an embodiment of the disclosure may buffer the received data for a predetermined time (for example, 5 seconds) and reproduce (e.g., display) the link content on the basis of the buffered data in operation 427.

Figure 5:
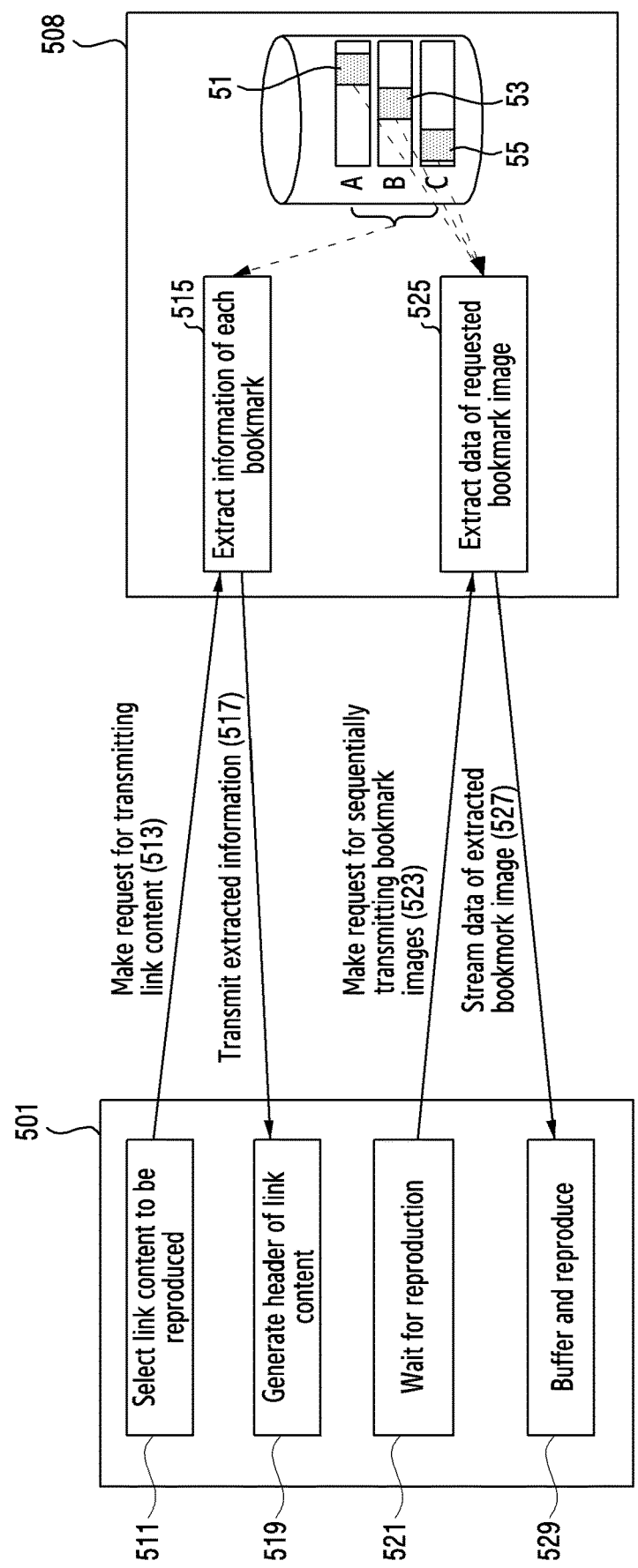
FIG. 5 illustrates a content reproduction method according to an embodiment of the disclosure.

FIG. 5 illustrates a content reproduction method according to an embodiment of the disclosure.

Referring to FIG. 5, an electronic device 501 (for example, the electronic device 101 or the electronic device 201) according to an embodiment of the disclosure may detect selection of link content to be reproduced in operation 511. When selection of the link content is detected, the electronic device 501 may generate a request for transmitting the selected link content to a server 508 (for example, the server 108 or the server 208) in operation 513.

The server 508 receiving the request for transmitting the link content may extract information on bookmark images included in the link content in operation 515 and transmit the extracted information to the electronic device 501 in operation 517. The information may include information on the bookmark images 41, 43, and 45 included in the link content.

The electronic device 501 according to an embodiment of the disclosure may generate a header of the link content in operation 519. For example, the electronic device 501 may generate the header of the link content by merging the received information.

The electronic device 501 according to an embodiment of the disclosure may enter a reproduction standby state in operation 521 and make a request for sequentially transmitting bookmark images to the server 508 in operation 523. For example, when a reproduction command is input, the electronic device 501 may make a request for transmitting a first bookmark image 51 included in the link content to the server 508, make a request for transmitting a second bookmark image 53 to the server 508 before reproduction of the first bookmark image 51 ends (for example, 5 seconds before the end), and make a request for transmitting a third bookmark image 55 to the server 508 before reproduction of the second bookmark image 53 ends (for example, 5 seconds before the end).

The server 508 according to an embodiment of the disclosure may extract data of the bookmark images of which transmission is requested in operation 525 and transmit the extracted data of the bookmark images to the electronic device 501 in operation 527. The electronic device 501 according to an embodiment of the disclosure may buffer the received data of the bookmark images for a predetermined time (for example, 5 seconds) and reproduce link content on the basis of the buffered data in operation 529.

According to the embodiment of the disclosure, unlike in FIG. 4, the header may be generated by the electronic device rather than the server and a request for sequentially transmitting bookmarks may be made to the server.

Figure 6:
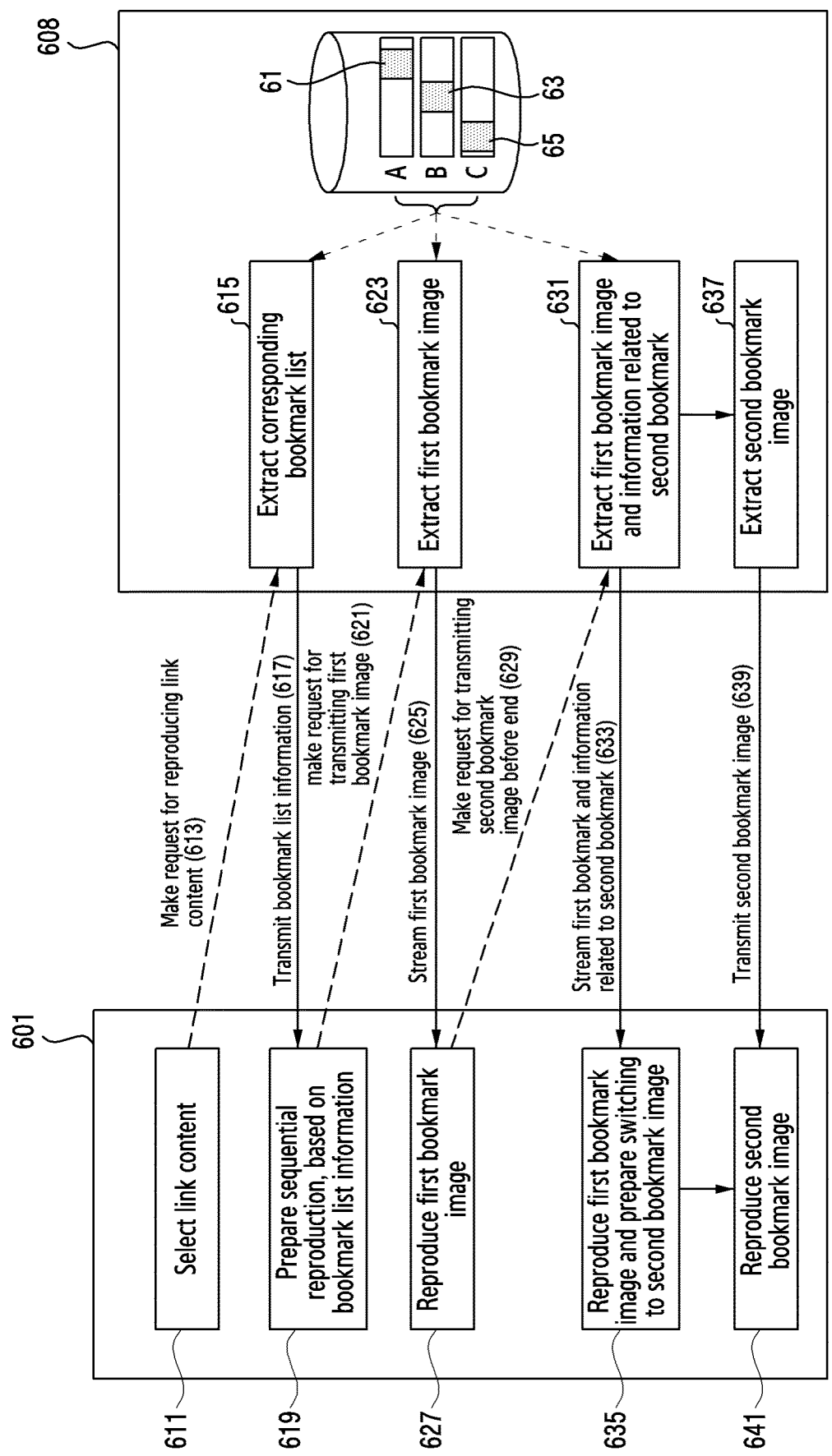
FIG. 6 illustrates a content reproduction method according to an embodiment of the disclosure.

FIG. 6 illustrates a content reproduction method according to an embodiment of the disclosure.

Referring to FIG. 6, an electronic device 601 (for example, the electronic device 101 or the electronic device 201) according to an embodiment of the disclosure may detect selection of link content to be reproduced in operation 611. When selection of the link content is detected, the electronic device 601 may make a request for reproducing the selected link content to a server 608 (for example, the server 108 or the server 208) in operation 613.

The server 608 receiving the request for reproducing the link content may extract a list of bookmarks included in the link content in operation 615 and transmit information on the extracted bookmark list information to the electronic device 601 in operation 617. For example, the server 608 may transmit bookmark list information including a first bookmark image 61, a second bookmark image 63, and a third bookmark image 65 to the electronic device 601.

The electronic device 601 according to an embodiment of the disclosure may enter a sequential reproduction standby state of the link content on the basis of bookmark list information in operation 619. For example, the electronic device 601 may generate a play list according to a bookmark image reproduction order and prepare sequential reproduction. For example, the electronic device 601 may generate a play list to sequentially reproduce the first bookmark image 61, the second bookmark image 63, and the third bookmark image 65.

The electronic device 601 according to an embodiment of the disclosure may make a request for transmitting the first bookmark image 61 to the server 608 in operation 621. According to an embodiment, when a reproduction command is detected, the electronic device 601 may make a request for transmitting the first bookmark image 61 to the server 608.

The server 608 according to an embodiment of the disclosure may extract data of the first bookmark image 61 in operation 623 and stream the extracted data to the electronic device 601 in operation 625.

The electronic device 601 according to an embodiment of the disclosure may reproduce the first bookmark image 61 on the basis of the received data in operation 627.

The electronic device 601 according to an embodiment of the disclosure may make a request for transmitting the second bookmark image 63 to the server 608 before reproduction of the first bookmark image 61 ends (for example, before 5 seconds) in operation 629.

The server 608 according to an embodiment of the disclosure may extract data corresponding to the first bookmark image 61 and information related to the second bookmark image 63 (for example, a screen shot, some images, or abstract information) in operation 631.

The server 608 according to an embodiment of the disclosure may transmit the data corresponding to the first bookmark image 61 and the information related to the second bookmark image 63 to the electronic device 601. The information related to the second bookmark image 63 may be used when the first bookmark image 61 is switched to the second bookmark image 63.

The electronic device 601 according to an embodiment of the disclosure may reproduce the first bookmark image 61 and prepare switching to the second bookmark image 63 in operation 635. For example, the electronic device 601 may display a screen shot included in the information on the screen after reproduction of the first bookmark image 61 is completed.

The server 608 according to an embodiment of the disclosure may extract data of the second bookmark image 63 in operation 637 and transmit the data of the second bookmark image 63 to the electronic device 601 in operation 639.

The electronic device 601 according to an embodiment of the disclosure may reproduce the second bookmark image 63 in operation 641. For example, the electronic device 601 may buffer the second bookmark image 63 for a predetermined time and then reproduce the second bookmark image 63.

According to some embodiments, the server 608 may transmit the second bookmark image 63 to the electronic device 601 before reproduction of the first bookmark image 61 ends, so that the second bookmark image 63 can be immediately reproduced after the reproduction of the first bookmark image 61 ends. Meanwhile, when the reproduction of the first bookmark image 61 is completed but the second bookmark image 63 is not sufficiently buffered, the electronic device 601 may display the screen shot included in the information on the screen while buffering the second bookmark image 63.

Operations 629 to 641 may be repeated until all of the bookmark images included in the link content are reproduced. For example, the electronic device 601 may make a request for transmitting the third bookmark image 65 to the server 608 before the second bookmark image 52 ends (for example, before 5 seconds).

According to the embodiment of the disclosure, the play list may be generated without generation of the header, and bookmark images included in the link content may be sequentially reproduced according to the play list.

According to various example embodiments of the present disclosure, an electronic device (e.g., the electronic device (101), the electronic device (201), the electronic device (401), the electronic device (501), the electronic device (601)) may include: a display (e.g., the display device (160)); a processor (e.g., the processor (120)) operatively connected to the display; and a memory (e.g., the memory (130)) operatively connected to the processor. The memory stores instructions causing the processor, when executed, to display a plurality of bookmarks stored in the memory on the display, detect selection of at least two bookmarks from the plurality of displayed bookmarks, and generate link content including the at least two selected bookmarks in response to a user input, and each of the plurality of bookmarks includes additional information containing information on some sections selected by a user while three-dimensional moving image content is reproduced and viewpoint information of the sections.

According to various example embodiments, the link content may be generated to include address information, section information, and the additional information of each of the at least two bookmarks.

According to various example embodiments, the instructions cause the processor to provide, when the bookmark is generated, at least one piece of recommended tag information, a recommended section, a recommended view angle, or recommended area (place or attraction) information as recommended additional information, based on bookmark information of at least one other user related to the three-dimensional moving image content being reproduced or some sections selected as the bookmark. Or, the instructions cause the processor to receive, when the bookmark is generated, recommended additional information from a predetermined server (e.g., the server (108), the server (208), the server (408), the server (508), the server (608)) through a communication circuit (e.g., the communication module (190)) and provide the recommended additional information.

According to various example embodiments, the instructions cause the processor to update recommended tag information, based on the added tag information and arrange recommended tag information having high correlation with the recommended tag information on the top of a list in response to additional of the tag information by a user.

According to various example embodiments, the instructions cause the processor to sequentially reproduce images corresponding to the at least two bookmarks in response to a request for reproducing the link content.

According to various example embodiments, the three-dimensional moving image content may be a 360-degree image. The viewpoint information may include first viewpoint information and second viewpoint information. The instructions cause the processor to reproduce an image corresponding to a bookmark by adjusting a view angle to correspond to the first viewpoint information.

According to various example embodiments, the instructions cause the processor to display guide information for inducing adjustment of the view angle to correspond to the second viewpoint information on the display.

According to various example embodiments, the link content may be reproduced in a streaming type. The instructions cause the processor to make a request for transmitting an image corresponding to a next-order bookmark of a currently reproduced bookmark among the at least two bookmarks a predetermined time before reproduction of an image corresponding to the currently reproduced bookmark ends among the at least two bookmarks and buffer the image corresponding to the next-order bookmark received from the server.

According to various example embodiments, the instructions cause the processor to display an indicator indicating switching to an image corresponding to a next-order bookmark of a currently reproduced bookmark among the at least two bookmarks will be performed on at least a portion of a screen a predetermined timer before reproduction of an image corresponding to the currently reproduced bookmark ends among the at least two bookmarks and continuously reproduce three-dimensional moving image content corresponding to the currently reproduced bookmark without transition to the image corresponding to the next-order bookmark after reproduction of the image corresponding to the currently reproduced bookmark ends when the indicator is selected.

According to various example embodiments, the instructions cause the processor to switch an image corresponding to a currently reproduced bookmark and an image corresponding to a next-order bookmark in a fade-in and fade-out type when the image corresponding to the currently reproduced bookmark is switched to the image corresponding to the next-order bookmark among the at least two bookmarks.

According to various example embodiments, the instructions cause the processor to control the display to display a control user interface including a menu area including at least one menu for controlling reproduction of the link content, a bookmark list area for displaying bookmarks included in the link content, and an information area for displaying information on the link content to be overlaid on the a reproduction screen in response to detection of a user input on the reproduction screen of the link content.

According to various example embodiments, the instructions cause the processor to display the additional information on a reproduction screen of the link content and provide at least one of recommended link content or a recommended bookmark related to the link content in response to selection of the additional information displayed on the reproduction screen of the link content.

According to various example embodiments of the present disclosure, an electronic device (e.g., the electronic device (101), the electronic device (201), the electronic device (401), the electronic device (501), the electronic device (601)) may include: a display (e.g., the display device (160)); a processor (e.g., the processor (120)) operatively connected to the display; and a memory (e.g., the memory (130)) operatively connected to the processor. The memory may store instructions causing the processor, when executed, to receive a request for reproducing link content including at least two bookmarks corresponding some intervals of a three-dimensional moving image content, extract first viewpoint information from additional information of a first bookmark included in the link content in response to the request for reproducing the link content, and adjust a view angle of an image corresponding to the first bookmark to reproduce a location corresponding to the extracted first viewpoint information.

According to various example embodiments, the instructions cause the processor to acquire second viewpoint information from at least one sensor included in the electronic device, and when the acquire second viewpoint information does not match second viewpoint information stored in the memory when the first bookmark is generated, display guide information for inducing movement of the view angle to match the second viewpoint information on the display.

Figure 7:
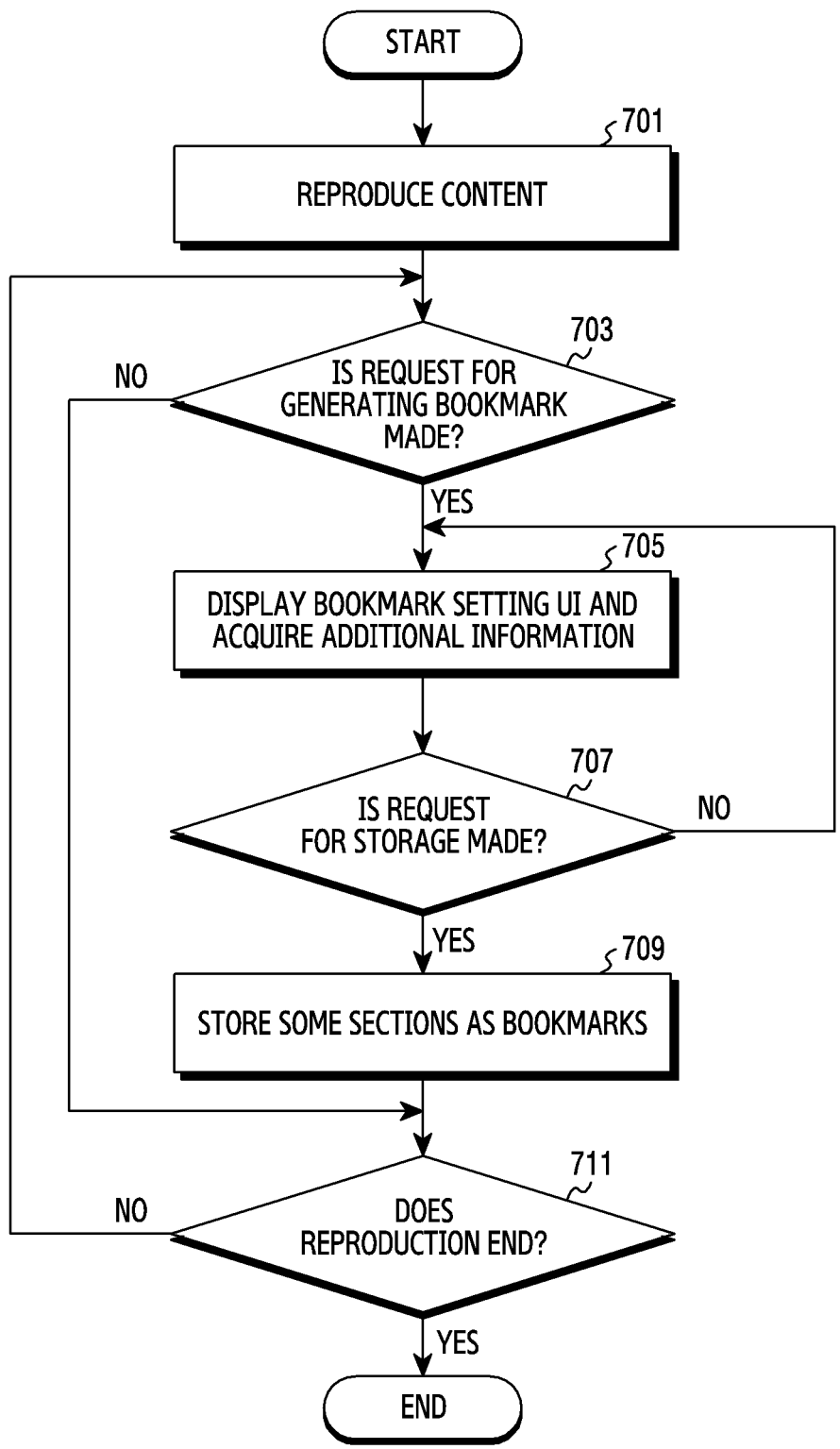
FIG. 7 is a flowchart illustrating a bookmark generation method according to an embodiment of the disclosure.
Figure 8A:
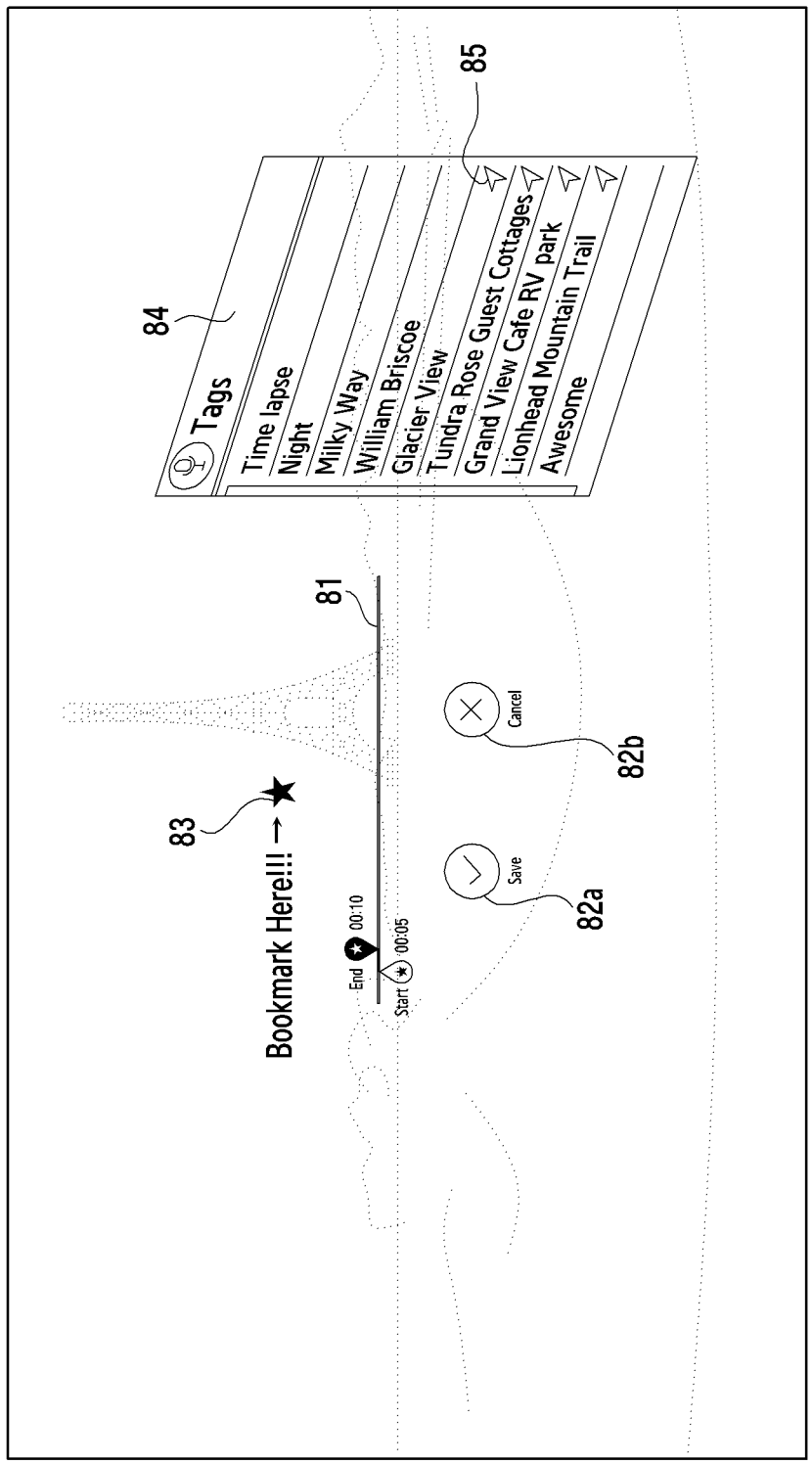
FIG. 8A illustrates a bookmark generation method according to an embodiment of the disclosure.
Figure 8B:
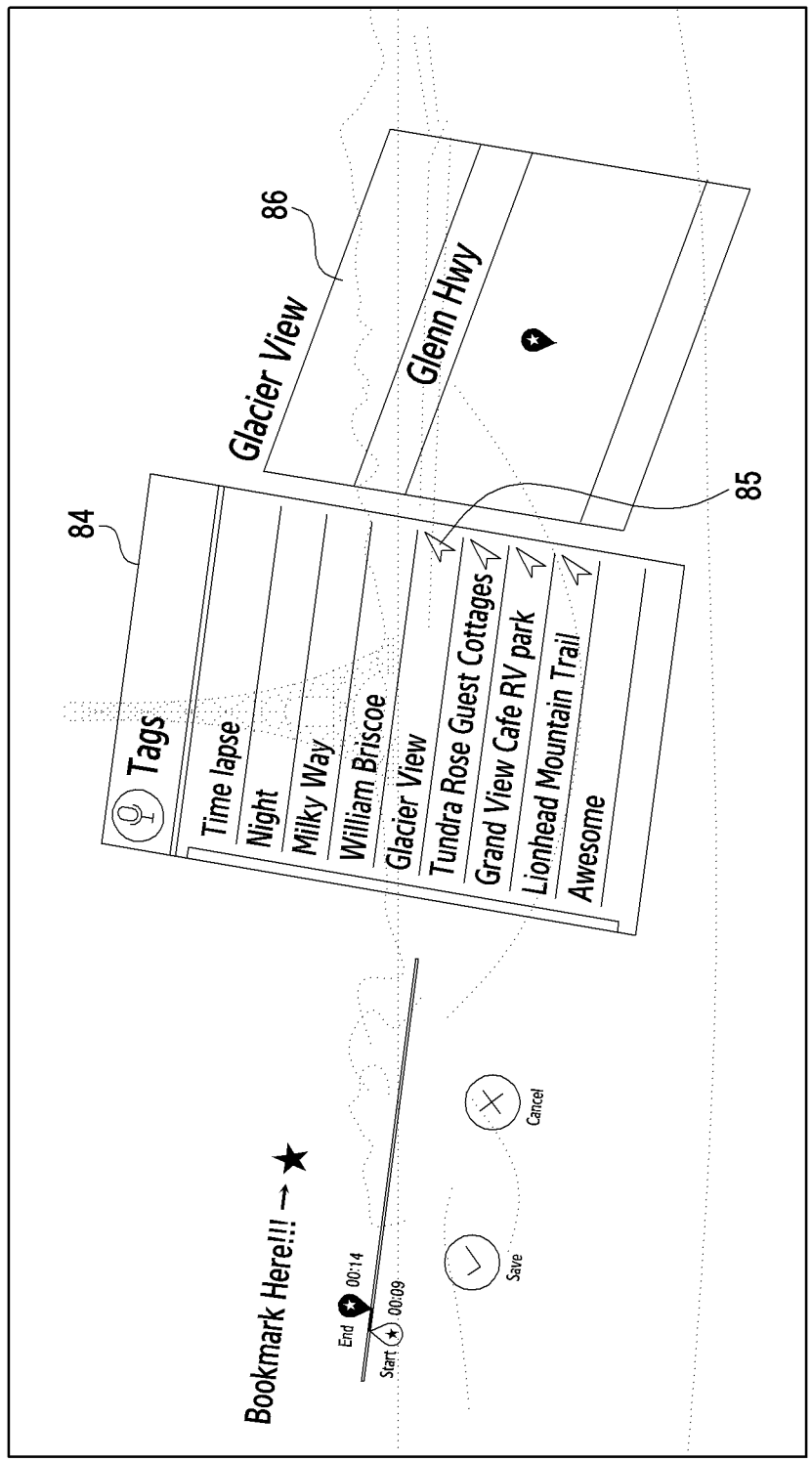
FIG. 8B illustrates a bookmark generation method according to an embodiment of the disclosure.
Figure 8C:
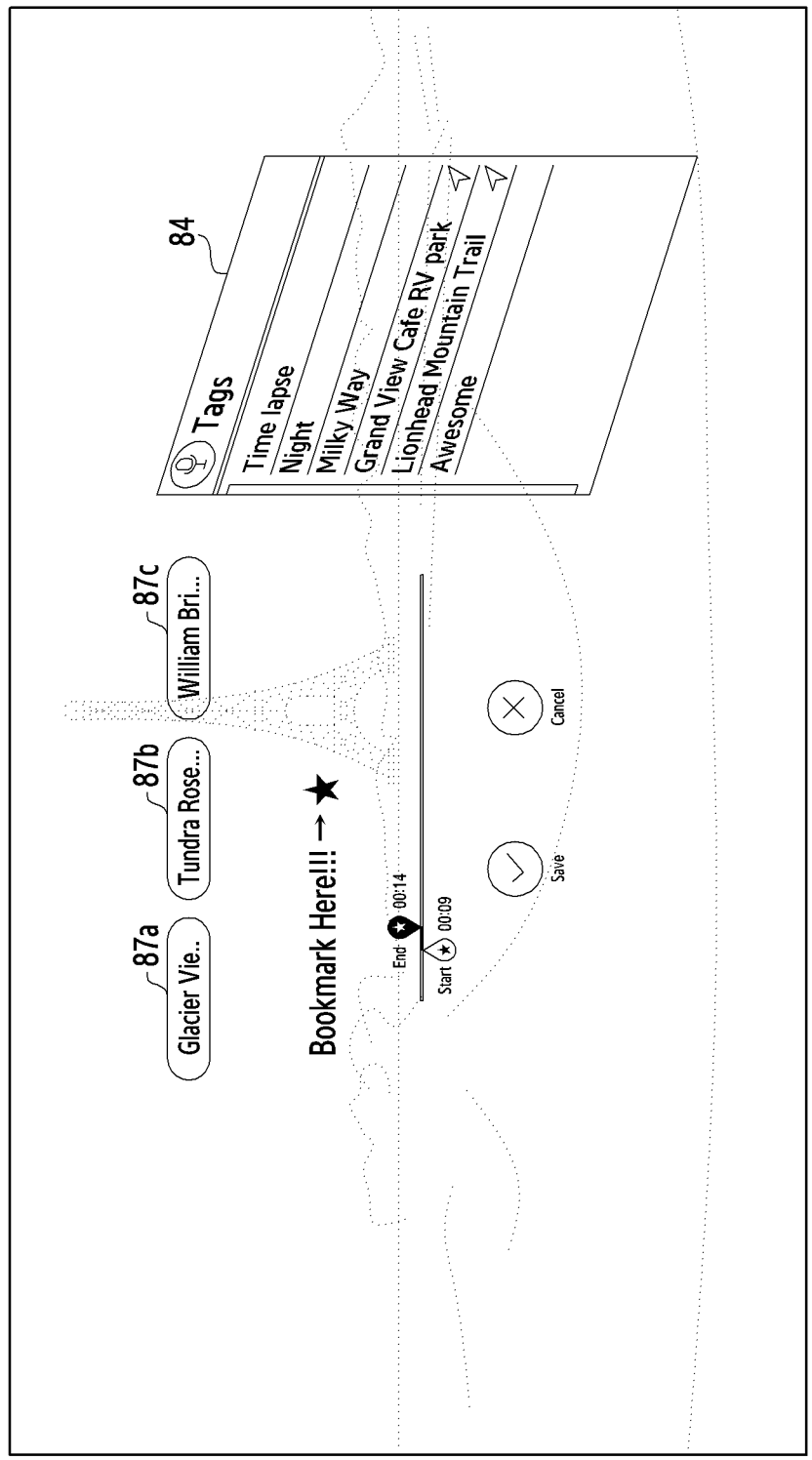
FIG. 8C illustrates a bookmark generation method according to an embodiment of the disclosure.
Figure 8D:
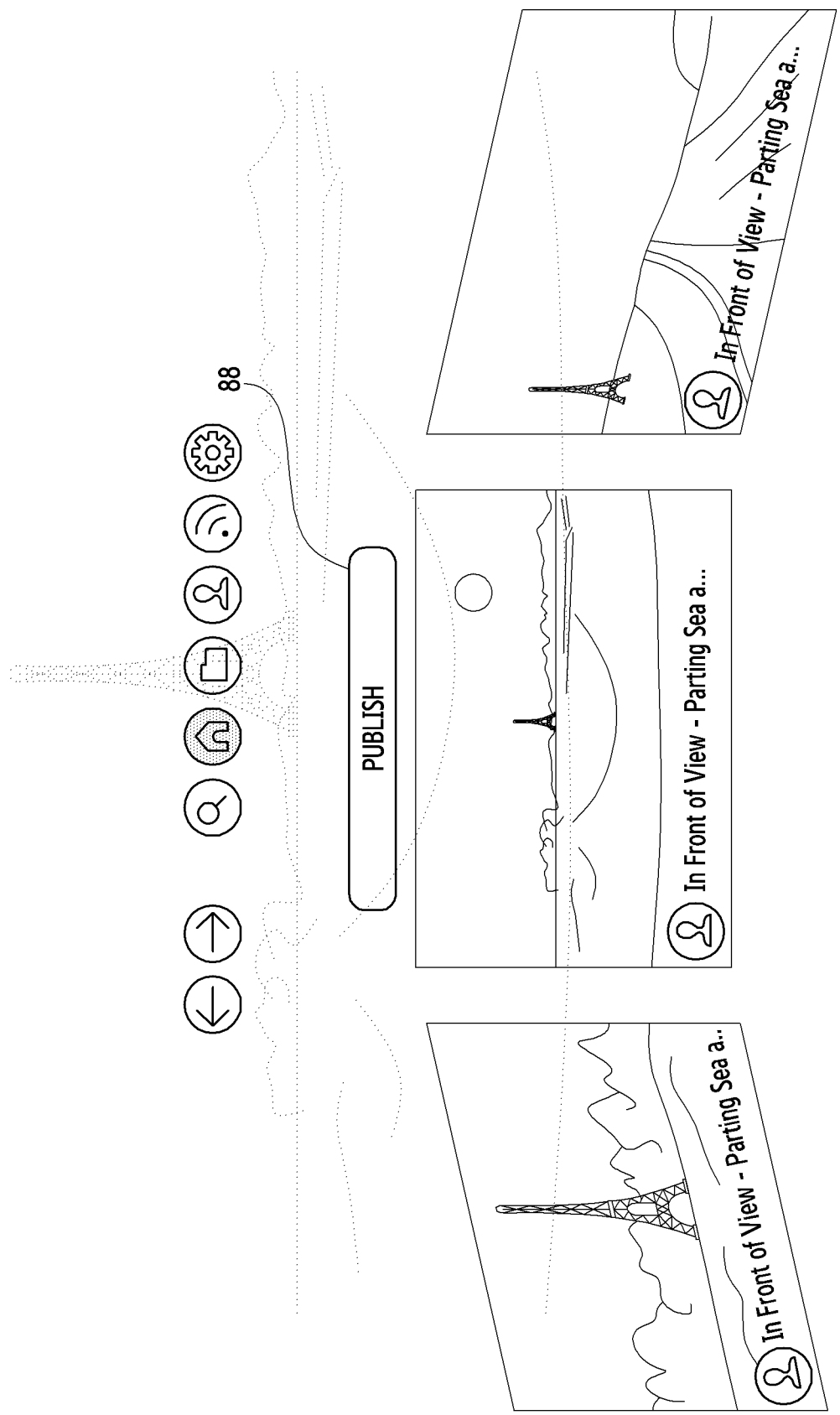
FIG. 8D illustrates a bookmark generation method according to an embodiment of the disclosure.

FIG. 7 is a flowchart illustrating a bookmark generation method according to an embodiment of the disclosure, FIG. 8A illustrates a bookmark generation method according to an embodiment of the disclosure, FIG. 8B illustrates a bookmark generation method according to an embodiment of the disclosure, FIG. 8C illustrates a bookmark generation method according to an embodiment of the disclosure, and FIG. 8D illustrates a bookmark generation method according to an embodiment of the disclosure.

Referring to FIGS. 7 to 8D, a processor (for example, the processor 120) of an electronic device (for example, the electronic device 101, the electronic device 201, the electronic device 401, the electronic device 501, or the electronic device 601), according to an embodiment of the disclosure, may reproduce content in operation 701. For example, the processor may receive a moving image from a server (that is, for example, the server 108, the server 208, the server 408, the server 508, or the server 608) accessed through a communication module (for example, the communication module 190) via streaming, and reproduce the moving image. The content may be a three-dimensional moving image captured through a 360-degree camera.

The processor according to an embodiment of the disclosure may identify whether a request for generating a bookmark is received in operation 703. The request for generating the bookmark may be received through a predetermined touch input, key input, voice input, or gesture input. The request for generating the input may select a section of the three-dimensional moving image.

When the request for generating the bookmark is not received on the basis of the identification result of operation 703, the processor may proceed to operation 711 described below. On the other hand, when the request for generating the bookmark is received on the basis of the identification result of operation 703, the processor may display a bookmark setting UI, and acquire additional information in operation 705. The bookmark setting UI may include, for example, a reproduction bar 81 for setting a start point and an end point of the section which is to be bookmarked, a save menu 82a, a cancel menu 82b, an indicator 83 indicating a set viewpoint (e.g., a view angle or field of view within the three-dimensional moving image), or a recommended tag list 84 as illustrated in FIG. 8A. At least some of the tags included in the recommended tag list 84 may include location information. The tags including the location information may be displayed on one side of an icon 85 indicating inclusion of the location information. When the tag including the location information is selected, a map 86 showing the corresponding location may be displayed as illustrated in FIG. 8B.

The additional information may include viewpoint information. The viewpoint information may include yaw and pitch of a three-dimensional image. According to an embodiment, the additional information may include tags 87a, 87b, and 87c selected from the recommended tag list 84 or directly input by the user as illustrated in FIG. 8C.

According to an embodiment, the processor may acquire additional information by extracting creator information, eye gaze information, or location information related to the reproduced content.

According to an embodiment, the processor may receive at least one piece of recommended tag information, recommended section information, recommended view angle information, or recommended area (place or attraction) information from the server on the basis of bookmark information of another user related to reproduced content or a section to be bookmarked.

According to an embodiment, the processor may update recommended tag information on the basis of the added tag information and arrange the recommended tag information having high correlation with the added tag information on the top of a list in response to addition of the tag information by the user.

The processor according to an embodiment of the disclosure may identify whether saving is requested in operation 707. According to some embodiments, when selection of the cancel menu 82b is detected instead of the request for saving in operation 707, the processor may proceed to operation 711 and terminate operations. For example, the processor may identify whether a save menu on the bookmark setting UI is input.

When the saving is not requested on the basis of the identification result of operation 707, the processor may proceed to operation 705. On the other hand, when the saving is requested on the basis of the identification result of operation 707, the processor may save the selected sections of the content along with the acquired additional information pertinent to the selected content as a bookmark in operation 709. For example, the saved bookmark may be stored in a bookmark storage area 88 (for example, a folder) as illustrated in FIG. 8D.

The processor according to an embodiment of the disclosure may identify whether reproduction of the content ends in operation 711. When reproduction does not end on the basis of the identification result of operation 711, the processor may proceed to operation 703. On the other hand, when reproduction ends on the basis of the identification result of operation 711, the processor may end the bookmark generation operation.

Figure 9A:
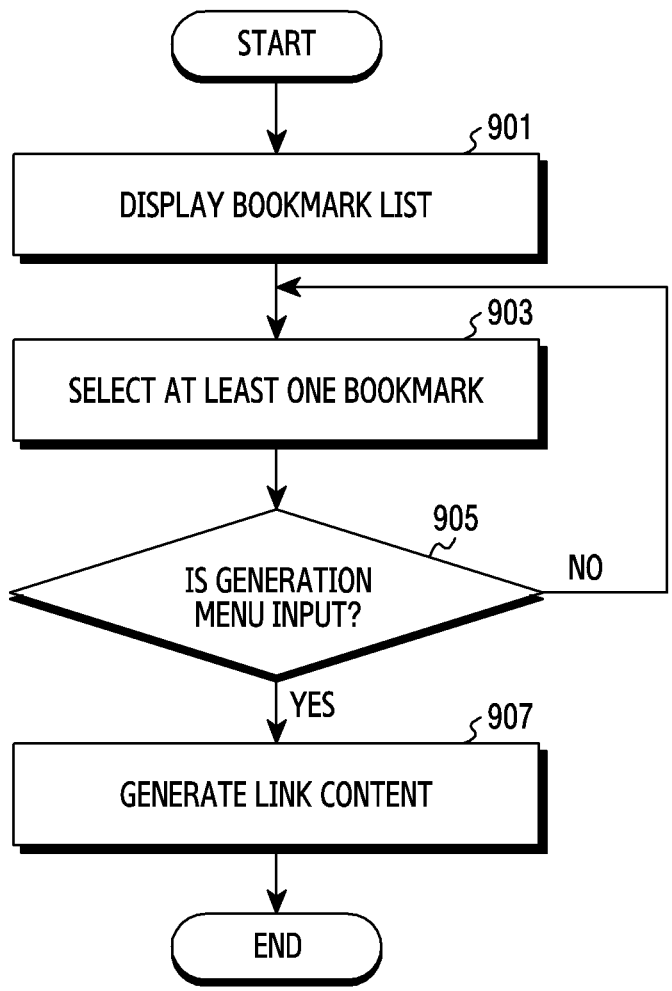
FIG. 9A is a flowchart illustrating a link content generation method according to an embodiment of the disclosure.

FIG. 9A is a flowchart illustrating a method of generating link content according to an embodiment of the disclosure.

Referring to FIG. 9A, a processor (for example, the processor 120) of an electronic device (for example, the electronic device 101, the electronic device 201, the electronic device 401, the electronic device 501, or the electronic device 601) according to an embodiment of the disclosure may display a bookmark list (for example, see FIG. 8D) in operation 901. For example, the processor may display the bookmark list based on receiving a request from the user to display the bookmark list.

The processor according to an embodiment of the disclosure may detect selection of at least one bookmark in operation 903. For example, the user may select at least one bookmark to be connected sequentially or simultaneously, through, for example, multiple touch inputs to a touch screen display.

The processor according to an embodiment of the disclosure may identify whether a generation command is input in operation 905 (e.g., a request or command to generate link content). The generation command may be a predetermined menu, key, voice, or gesture input.

When the generation command is not input on the basis of the identification result of operation 905, the processor may return to operation 903. On the other hand, when the generation command is input on the basis of the identification result of operation 905, the processor may generate link content by connecting (e.g., linking, combining) the selected bookmarks in operation 907. The link content may include a link (for example, a URL) and additional information (section information, viewpoint information, thumbnail information, or tag information) of a moving image corresponding to each bookmark rather than an image file obtained by cutting and combining actual data. For example, the link content may be stored as shown in [Table 1] below.

TABLE 1

```
{
  "id":      1001,
  "title": "My one week plan in Paris",
```

TABLE 1-continued

```
| "creator_id": 1004,
| "list": [
|   {
|     "start": 7,
|     "end": 20,
|     "view_angle":"-0.004689428,0.9739237,0.2266724,0.008385408",
|     "thumb2D_url": "./Database/images/bookmark_Thumb360/The EiffelTower/7.png",
|     "thumb360_url": "./Database/images/bookmark_Thumb360/The EiffelTower/7.png",
|     "video_id": 1007,
|     "tags": [
|             1077,
|             1047,
|             1048,
|             1045,
|             1042
|     ]
|   },
|   {
|     "start": 25,
|     "end": 55,
|     "view_angle":"0.03103803,0.8204113,0.0505401,0.5686894",
|     "thumb2D_url": "./Database/images/bookmark_Thumb360/Visit Parisin virtual real",
|     "thumb360_url": "./Database/images/bookmark_Thumb360/Visit Parisin virtual rea",
|     "video_id": 1012,
|     "tags": [
|             1049,
|             1076
|     ]
|   },
|
```

The link content in [Table 1] above may include an identifier (id:1001), a title (title: My one week plan in Paris), a creator (creator_id: 1004), and list information. The list information may include information on a first bookmark and a second bookmark included in the link content. Referring to the list information, the first bookmark may be an image between 7 seconds and 20 seconds of a first image (video_id: 1007) and the second bookmark may be an image between 25 seconds and 55 seconds of a second image (video id: 1012). Further, the list information may include a thumbnail address and tag information of a two-dimensional image and a 360-degree image.

[Table 1] below is only an example, but is not limited to an embodiment of the disclosure.

Figure 9B:
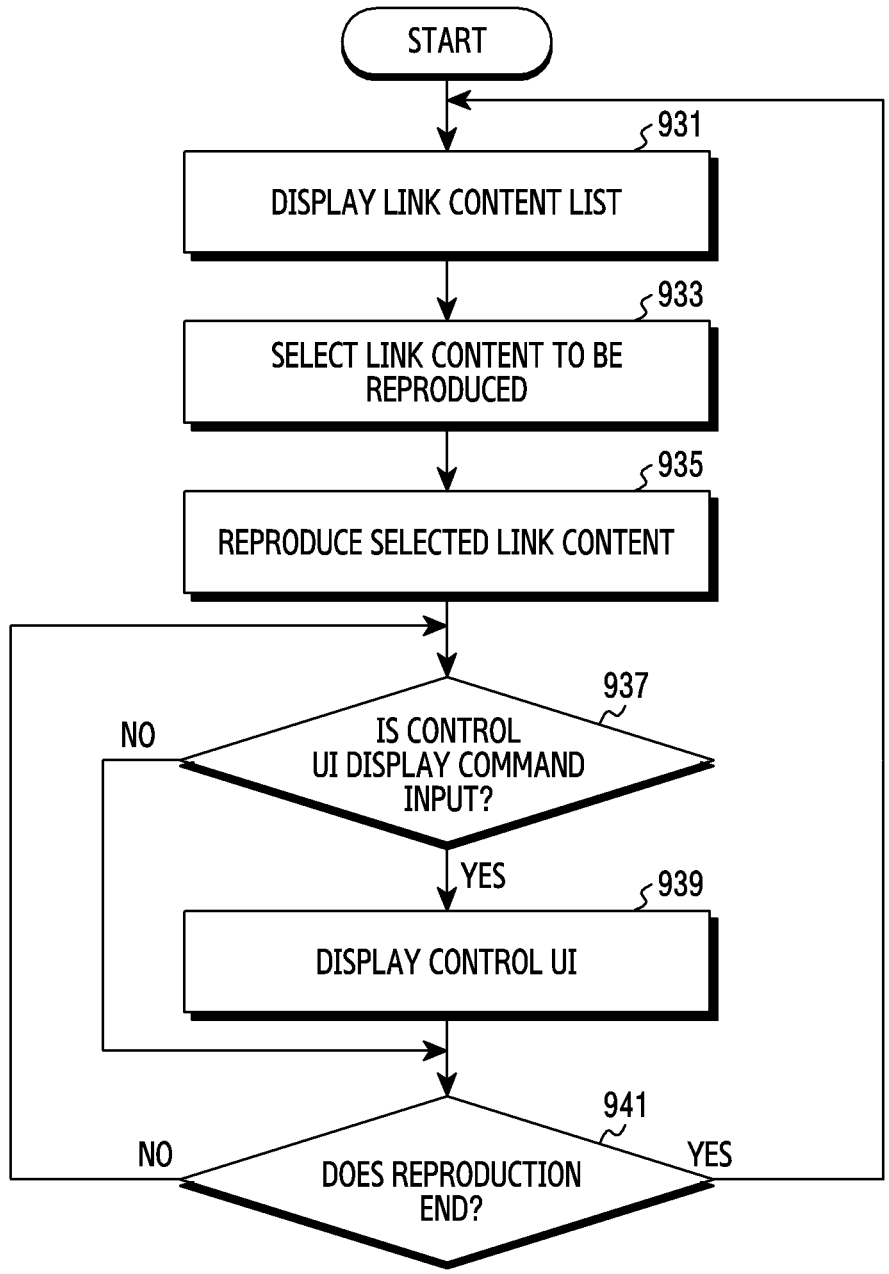
FIG. 9B is a flowchart illustrating a link content reproduction method according to an embodiment of the disclosure.
Figure 10A:
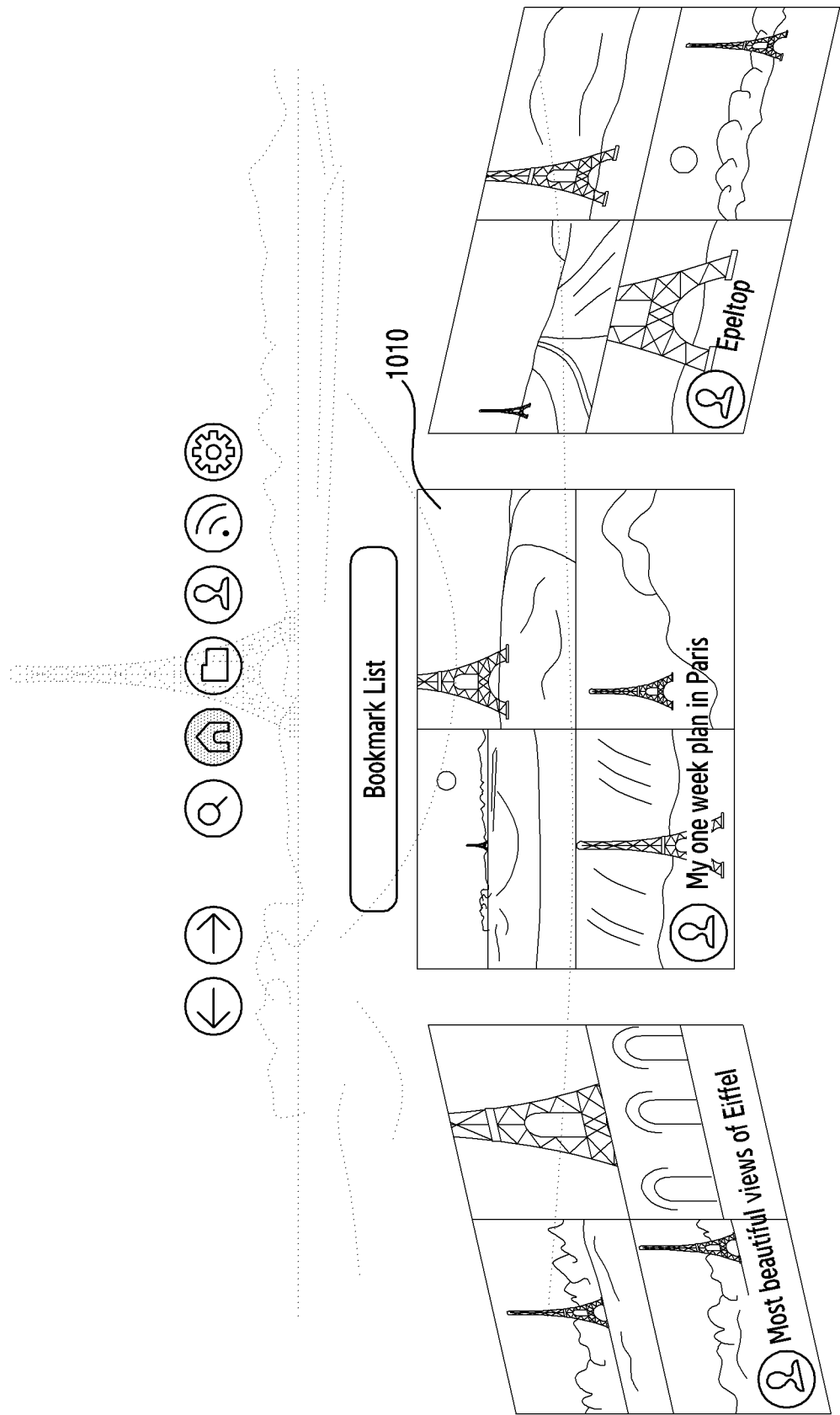
FIG. 10A illustrates a link content reproduction method according to an embodiment of the disclosure.
Figure 10B:
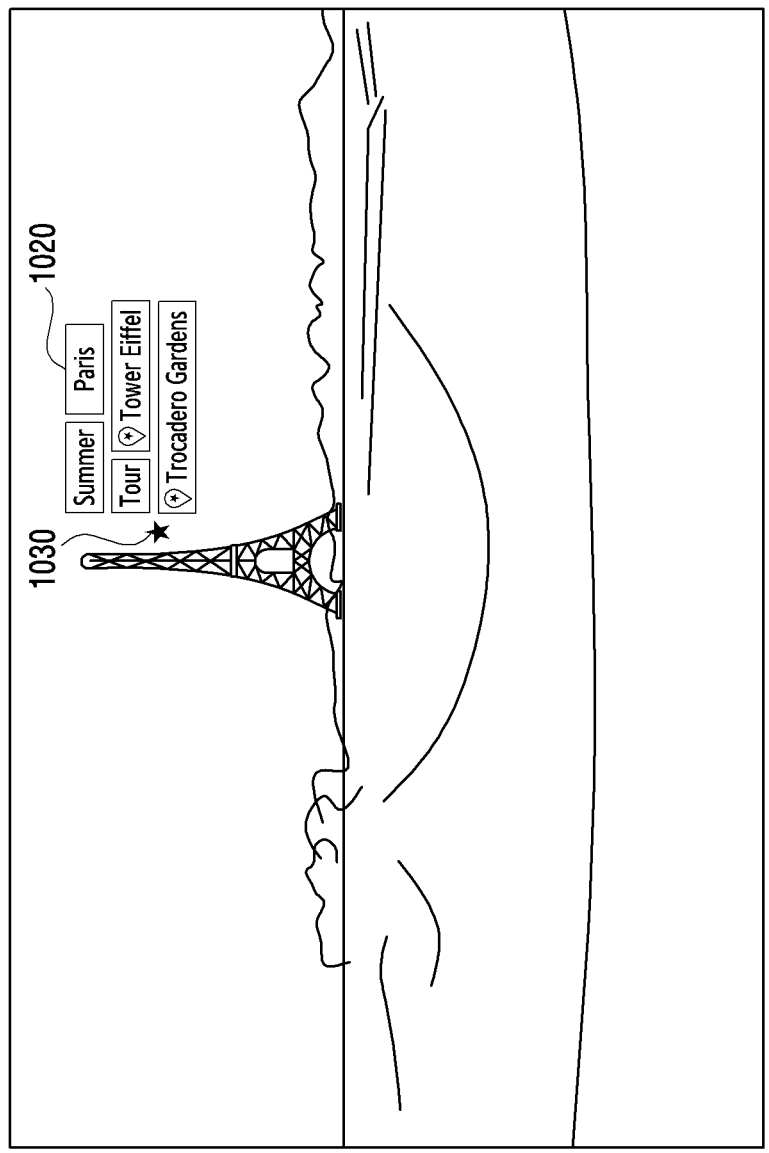
FIG. 10B illustrates a link content reproduction method according to an embodiment of the disclosure.
Figure 10C:
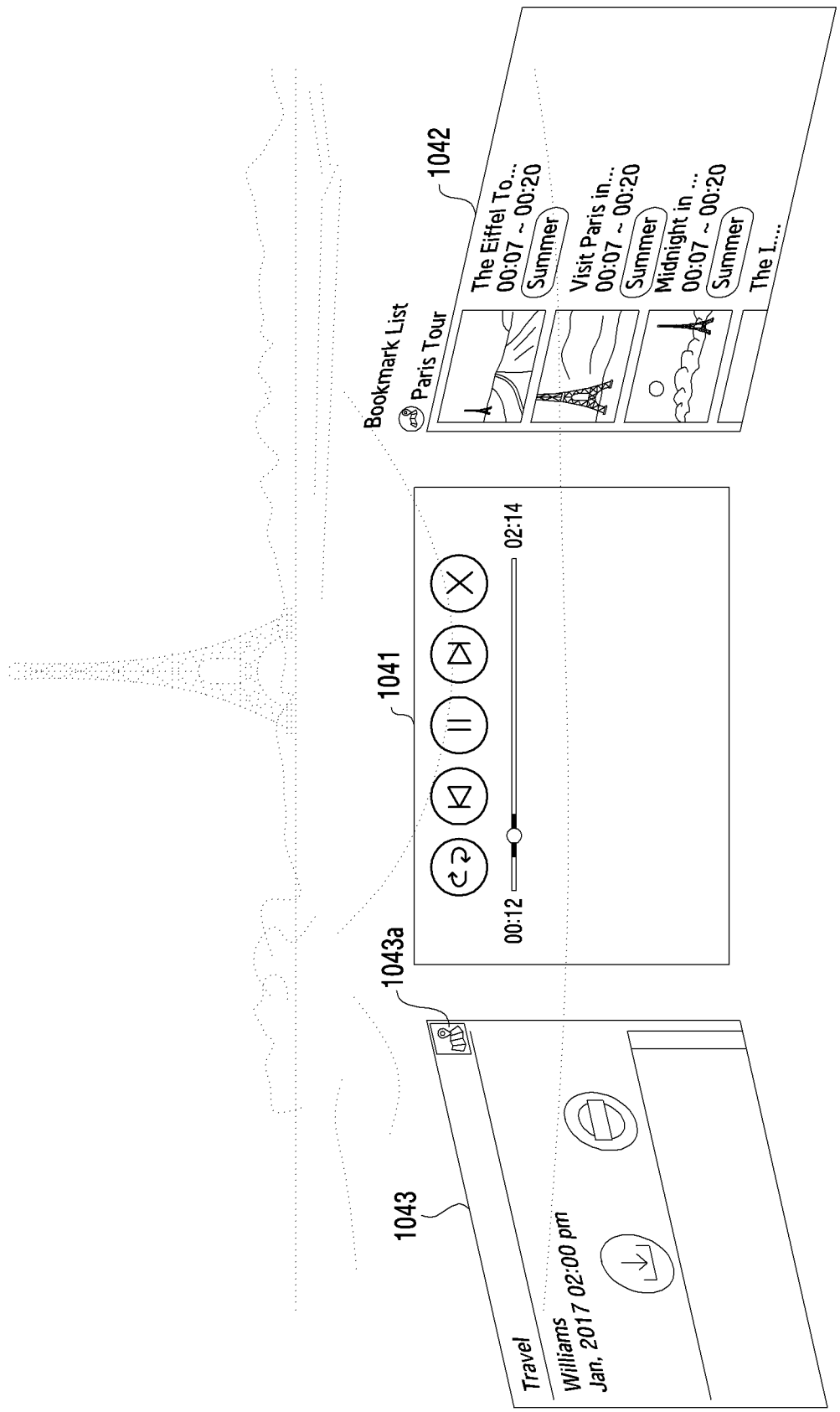
FIG. 10C illustrates a link content reproduction method according to an embodiment of the disclosure.
Figure 10D:
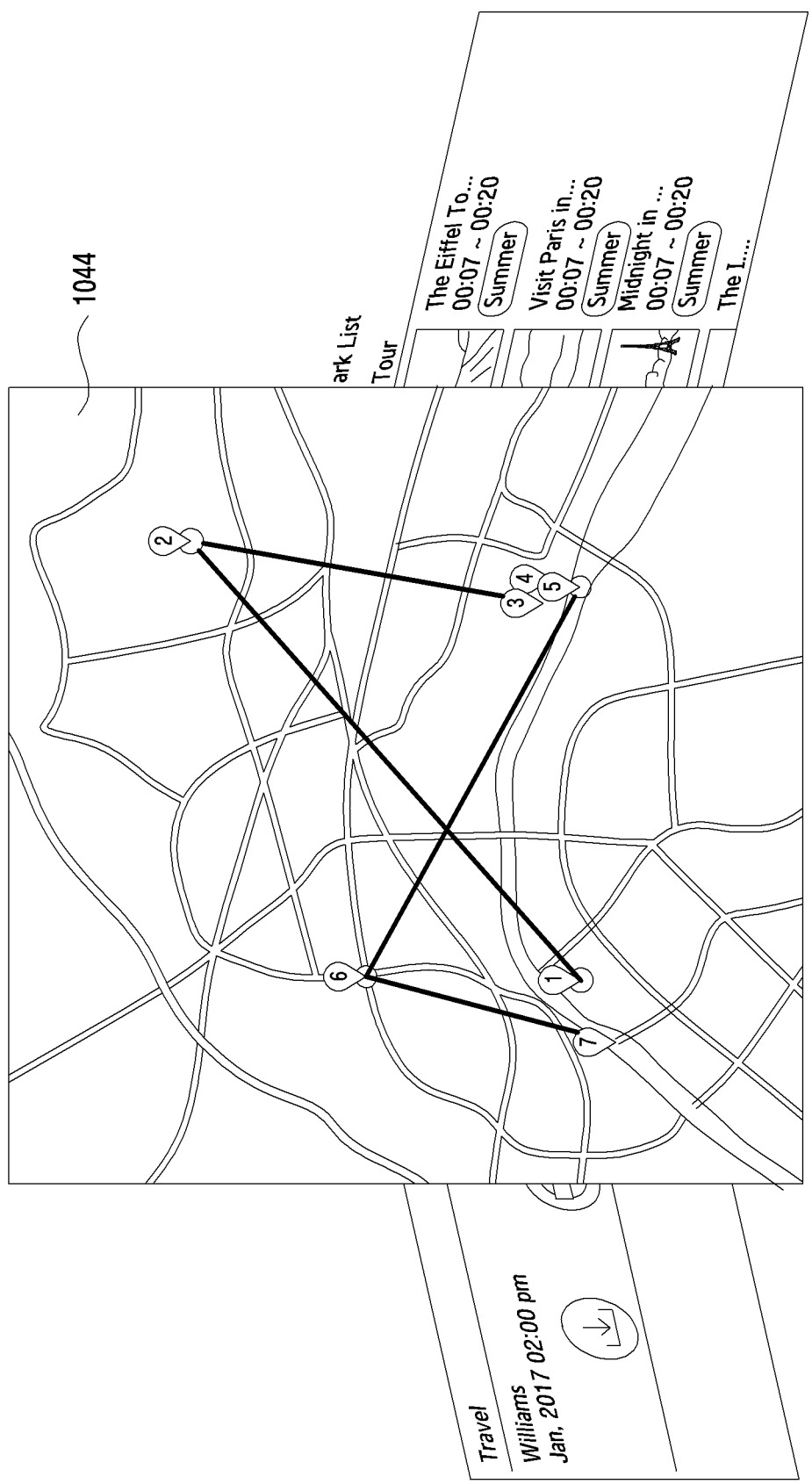
FIG. 10D illustrates a link content reproduction method according to an embodiment of the disclosure.
Figure 10E:
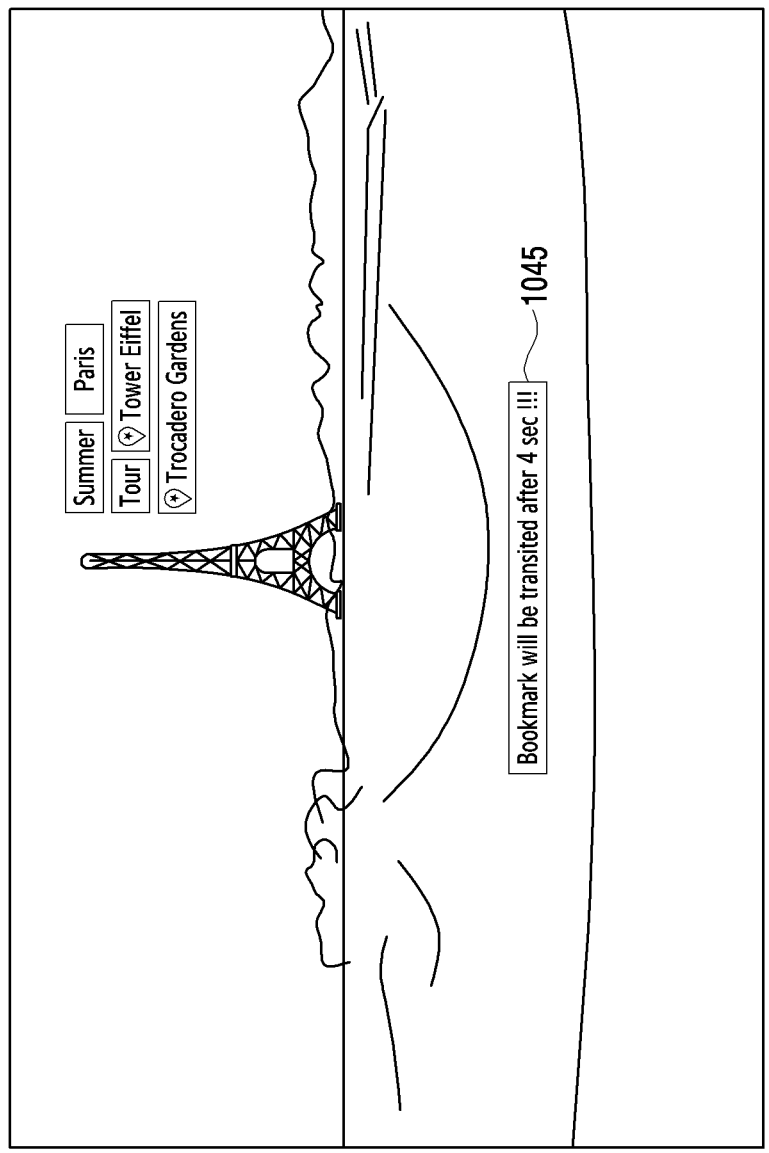
FIG. 10E illustrates a link content reproduction method according to an embodiment of the disclosure.
Figure 10F:
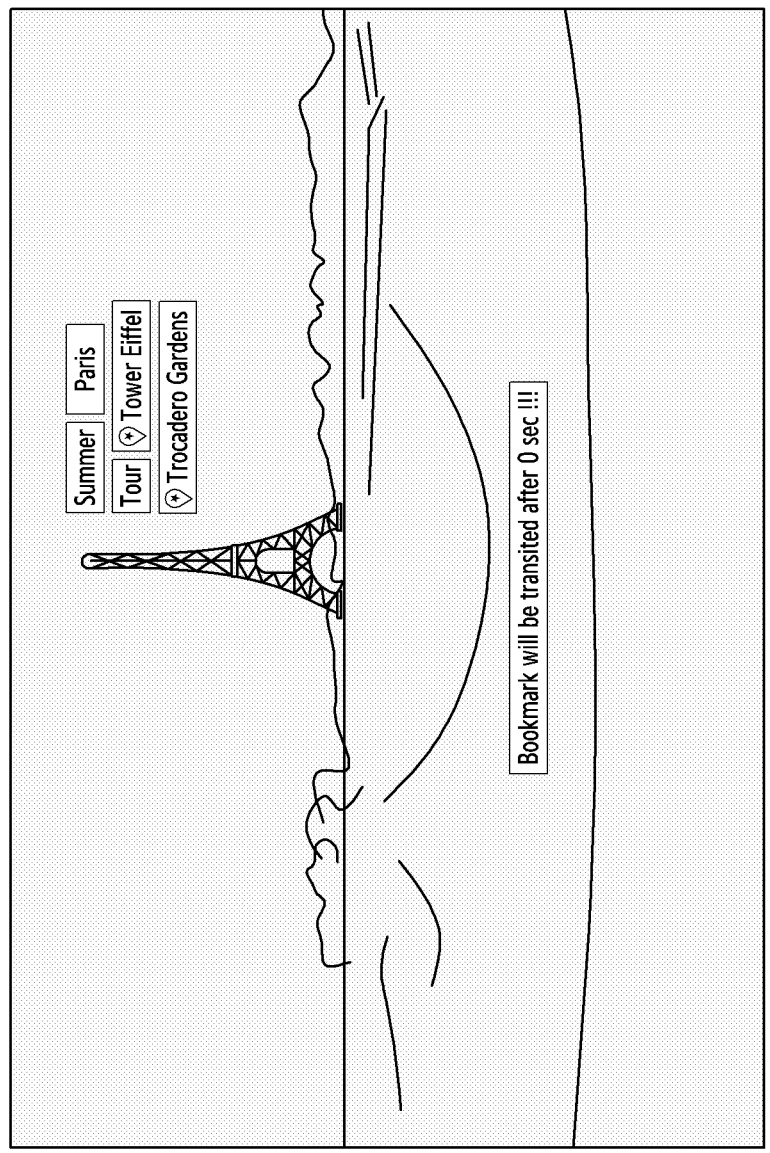
FIG. 10F illustrates a link content reproduction method according to an embodiment of the disclosure.
Figure 10G:
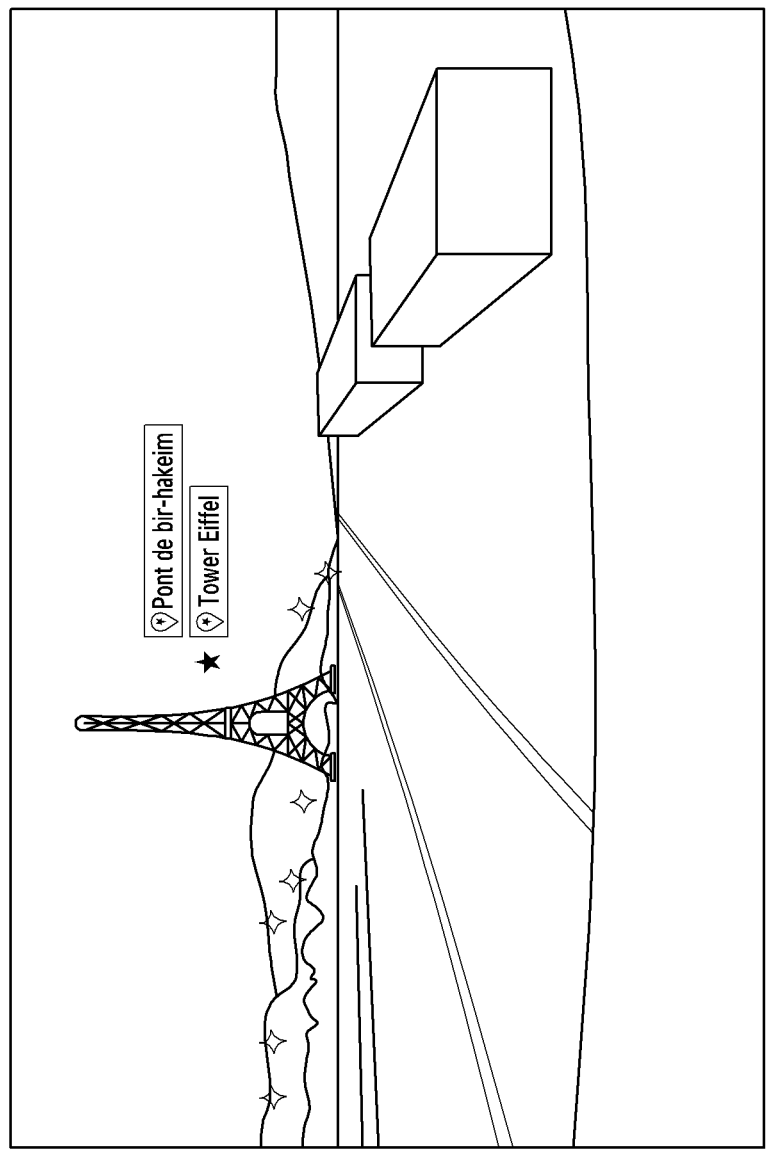
FIG. 10G illustrates a link content reproduction method according to an embodiment of the disclosure.

FIG. 9B is a flowchart illustrating a link content reproduction method according to an embodiment of the disclosure, FIG. 10A illustrates a link content reproduction method according to an embodiment of the disclosure, FIG. 10B illustrates a link content reproduction method according to an embodiment of the disclosure, FIG. 10C illustrates a link content reproduction method according to an embodiment of the disclosure, FIG. 10D illustrates a link content reproduction method according to an embodiment of the disclosure, FIG. 10E illustrates a link content reproduction method according to an embodiment of the disclosure, FIG. 10F illustrates a link content reproduction method according to an embodiment of the disclosure, and FIG. 10G illustrates a link content reproduction method according to an embodiment of the disclosure.

Referring to FIGS. 9 to 10G a processor (for example, the processor 120) of an electronic device (for example, the electronic device 101, the electronic device 201, the electronic device 401, the electronic device 501, or the electronic device 601) according to an embodiment of the disclosure may control a display (for example, the display device 160) to display a link content list in operation 931. For example, the processor may receive a link content list from a server (for example, the server 108, the server 208, the server 408, the server 508, or the server 608) accessed through a communication module (for example, the communication module 190) and perform control to output the link content list on the display as illustrated in FIG. 10A. A thumbnail of the link content may be displayed as a combination of thumbnails of a plurality of pieces of content corresponding to bookmarks included in the link content as illustrated in FIG. 10A.

The processor according to an embodiment of the disclosure may detect selection of specific link content in operation 933. For example, as illustrated in FIG. 10A, the processor may detect selection (for example, touch input, voice input, button (key) input, eye gaze input, or gesture input) of one or more link content 1010 from among link content indicated in the displayed link content list.

The processor according to an embodiment of the disclosure may reproduce the selected link content in operation 935 (e.g., initiate playback). For example, as illustrated in FIG. 10B, the processor may sequentially receive images corresponding to a plurality of bookmarks included in the link content from a communication-connected server in a streaming manner and reproduce the images. For example, the processor may reproduce a first bookmark image among a plurality of bookmark images included in the link content. A reproduction screen of the link content may display together additional information 1020 and an indicator 1030 indicating a bookmarked viewpoint. According to an embodiment, the processor may provide relevant recommended link content or recommended bookmark when the indicator 1030 is selected. The processor may perform control to reproduce the corresponding image when the recommended link content or the recommended bookmark is selected.

In general, when a 360-degree image is reproduced, a direction in which the user currently faces may be set as a reference point (for example, yaw (0 degrees) and pitch (0 degrees)) of a three-dimensional image, and a front image may be reproduced. However, the processor may perform control to reproduce an image at a location corresponding to the yaw among viewpoint information (yaw and pitch) of a bookmark image to be reproduced. For example, when a first bookmark image is reproduced, the processor may perform control to extract viewpoint information from additional information included in the first bookmark image and reproduce a location corresponding to first viewpoint information (for example, yaw) among the extracted viewpoint information. For example, when the extracted first viewpoint information is 30 degrees, the processor may reproduce an image at a location rotated 30 degrees in a yaw direction rather than a reference point (0 degrees) of the 360-degree image. At this time, second viewpoint information (for example, pitch) of the reproduced image may be a reference point (for example, 0 degrees) rather than second viewpoint information among the viewpoint information of the first bookmark image. This is because reference point movement in a horizontal direction does not cause image distortion but reference point movement in a vertical direction may cause image distortion (for example, inclination).

According to an embodiment, guide information (for example, an arrow icon and/or angle information) informing of second viewpoint information (for example, pitch) of the first bookmark image may be displayed on the screen. For example, when the second viewpoint information of the first bookmark image is 60 degrees and the electronic device may display an image up to +30 degrees from the reference point (for example, the center of the screen) in a pitch direction, the processor may display guide information including an arrow in an upward direction and text information indicating "move 30 degrees or more".

The processor according to an embodiment of the disclosure may identify whether a control UI display command is input in operation 937. For example, the processor may identify whether a predetermined gesture (for example, shaking from side to side) is detected, a predetermined key is input, or a voice command is input to display a control UI.

When the control UI display command is not input on the basis of the identification result of operation 937, the processor may proceed to operation 941 described below. On the other hand, when the control UI display command is input on the basis of the identification result of operation 937, the processor may perform control to display a control UI in operation 939. For example, the processor may perform control to display the control UI to be overlaid on the reproduction screen as illustrated in FIG. 10C. According to an embodiment, when a request for reproducing link content is made, the processor may perform control to display the control UI and, when there is no input for a predetermined time or a reproduction menu is input, remove the control UI and display the reproduction screen.

The control UI may include a menu area 1041 including at least one menu for controlling reproduction of the link content, a bookmark list area 1042 for displaying linked bookmarks when the link content is reproduced, and an information display area 1043 for displaying information on the link content.

The bookmark list area 1042 may include bookmarks included in the link content. The currently reproduced bookmark may be displayed (for example, highlighted) to be visually distinguished from another bookmark. When a specific bookmark is selected in the bookmark list area 1042, the processor may perform control to reproduce the selected bookmark.

According to an embodiment, when selection of a map icon 1043a of the information display area 1043 is detected (for example, touch input), the processor may identify location information of each bookmark and perform control to display each piece of location information on a map 1044 as illustrated in FIG. 10D. When the user is traveling and the link content is an image obtained by capturing a tourist attraction of the corresponding area, the user may easily design a moving path on the basis of location information on the map.

According to an embodiment, the processor may notify that switching to a section image corresponding to the next-order bookmark will be performed a predetermined time before reproduction of the section image corresponding to the currently reproduced bookmark ends. For example, the processor may control the display to display text 1045 indicating that switching to the next bookmark will be performed on one side of the current reproduction screen as illustrated in FIG. 10E. According to an embodiment, the processor may perform control to display an icon informing of switching to the next bookmark image or output an effect sound or vibration. When the text 1045 is selected, the processor may continuously reproduce the current reproduced content without switching to the next bookmark.

According to an embodiment, in switching to the section image of the next bookmark, the processor may perform control to switch a view angle, an image, and a sound of the currently reproduced section image or the next section image in a fade-in and fade-out type. For example, the processor may fade out (gradually darken) the currently reproduced bookmark image and fade in (gradually lighten) the bookmark image to be reproduced next as illustrated in FIGS. 10F and 10G.

The processor according to an embodiment of the disclosure may identify whether reproduction ends in operation 941. When reproduction does not end on the basis of the identification result of operation 941, the processor may return to operation 937. On the other hand, when reproduction ends on the basis of the identification result of operation 941, the processor may return to operation 931.

Figure 11A:
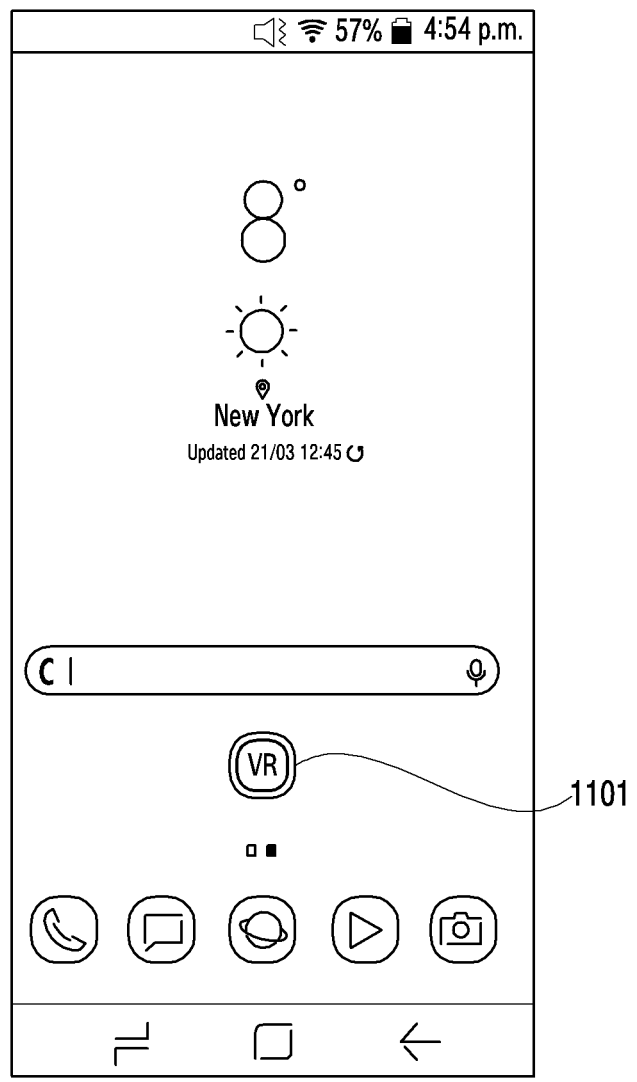
FIG. 11A illustrates a method of generating a bookmark and link content according to an embodiment of the disclosure.
Figure 11B:
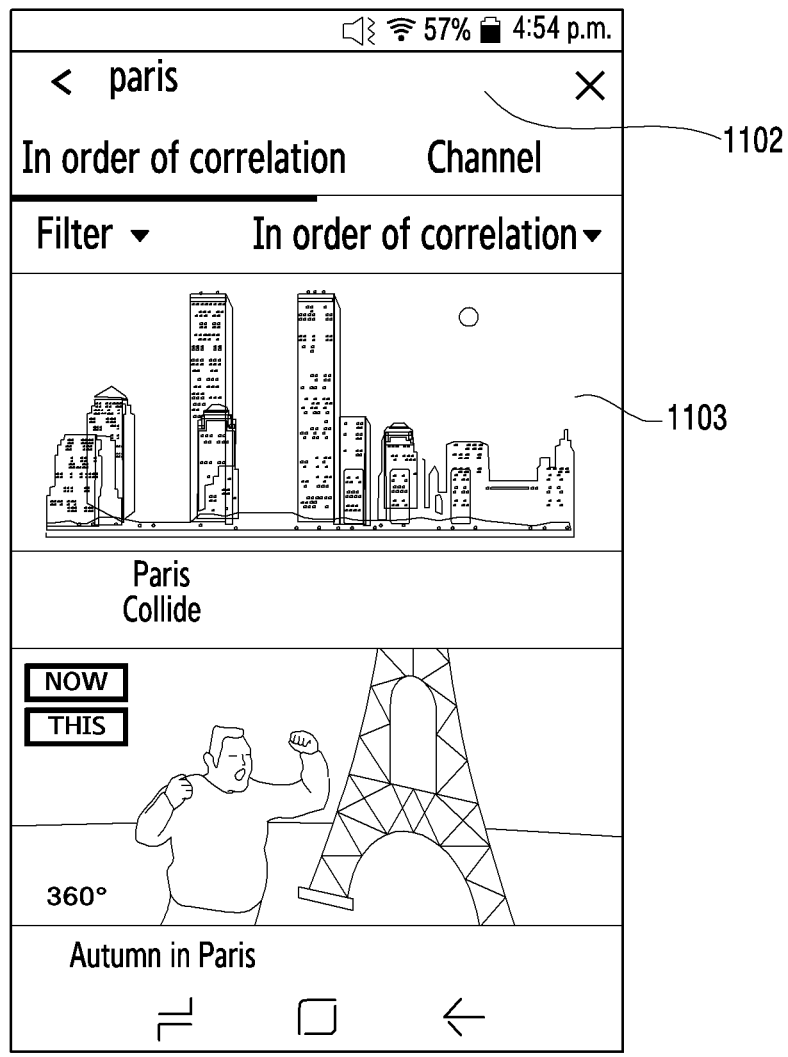
FIG. 11B illustrates a method of generating a bookmark and link content according to an embodiment of the disclosure.
Figure 11C:
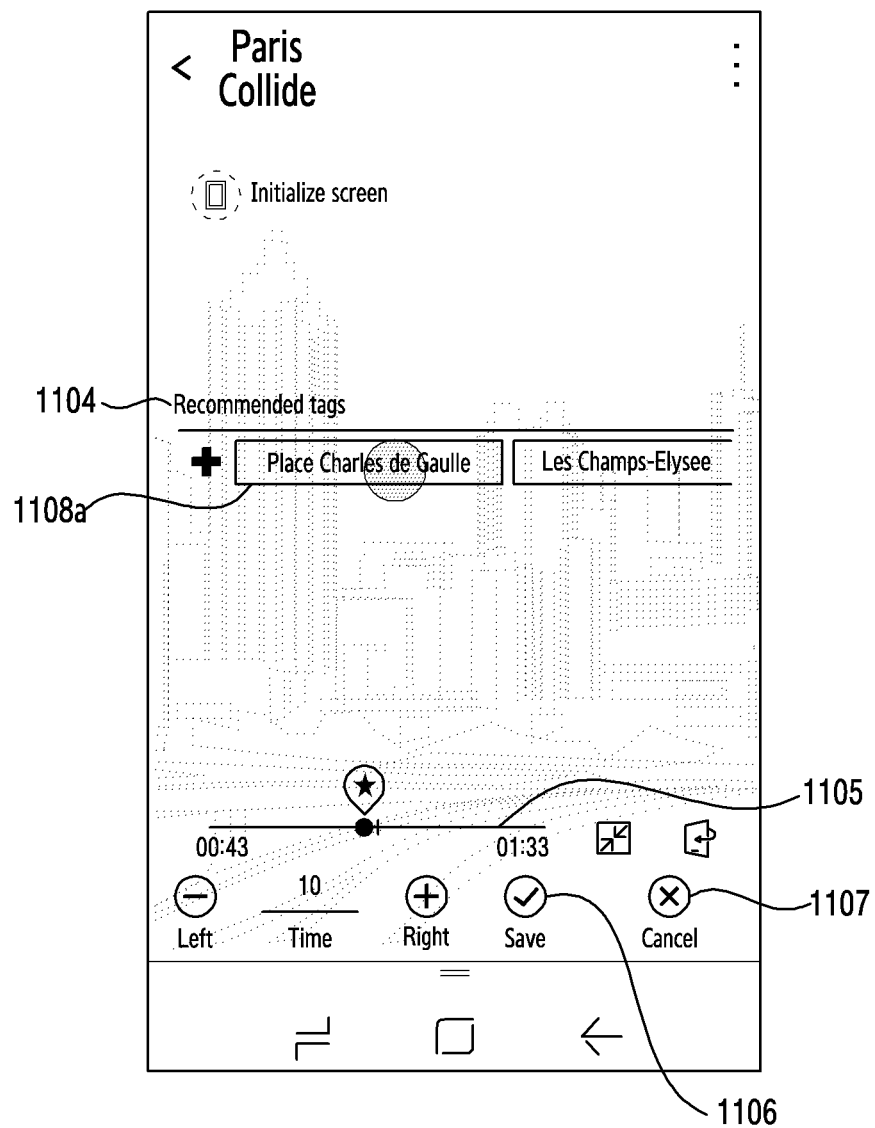
FIG. 11C illustrates a method of generating a bookmark and link content according to an embodiment of the disclosure.
Figure 11D:
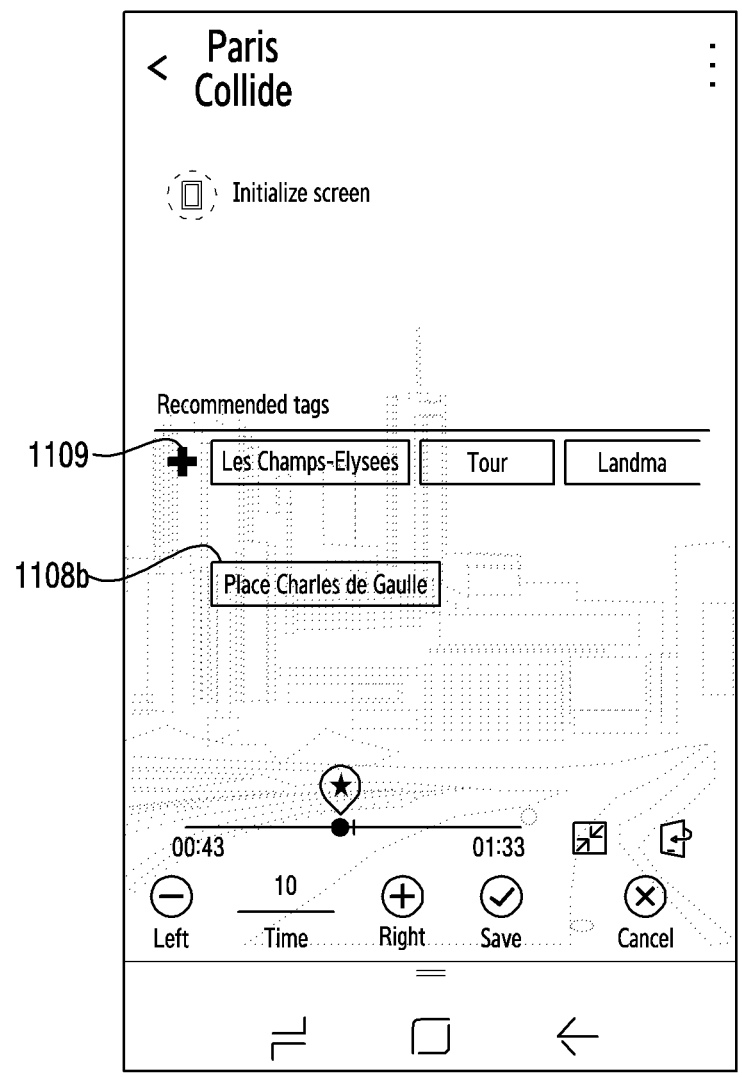
FIG. 11D illustrates a method of generating a bookmark and link content according to an embodiment of the disclosure.
Figure 11E:
FIG. 11E illustrates a method of generating a bookmark and link content according to an embodiment of the disclosure.
Figure 11F:
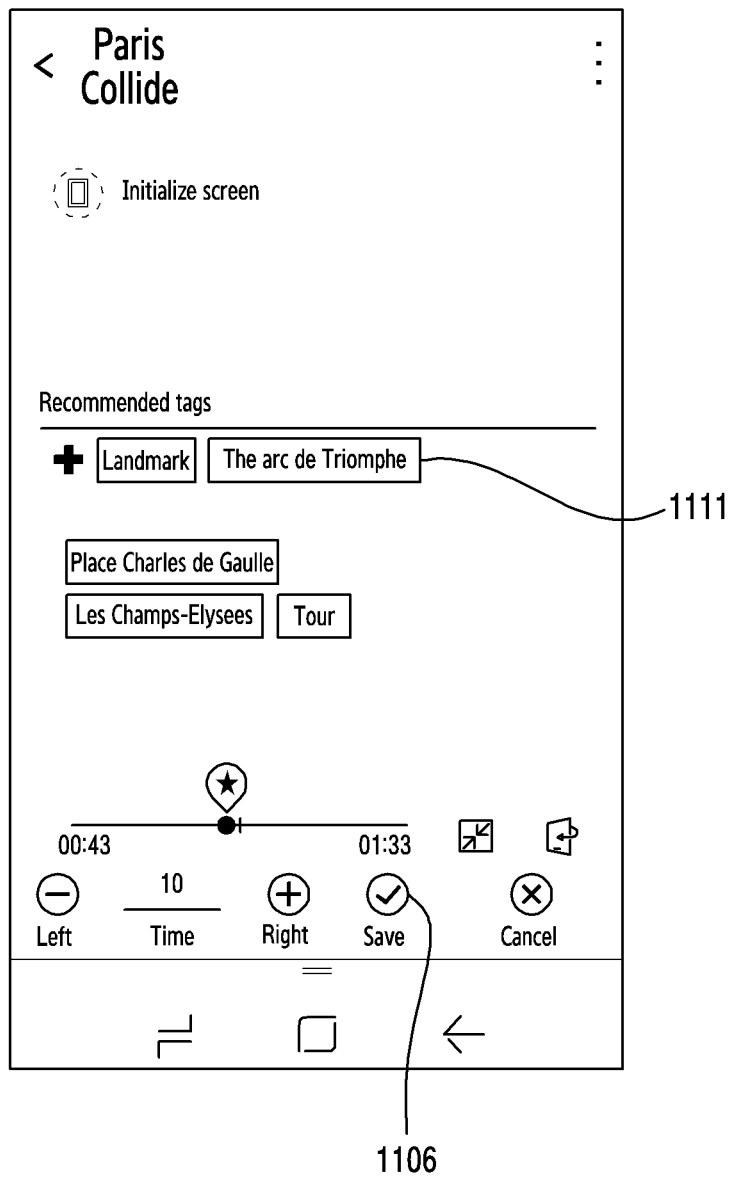
FIG. 11F illustrates a method of generating a bookmark and link content according to an embodiment of the disclosure.
Figure 11G:
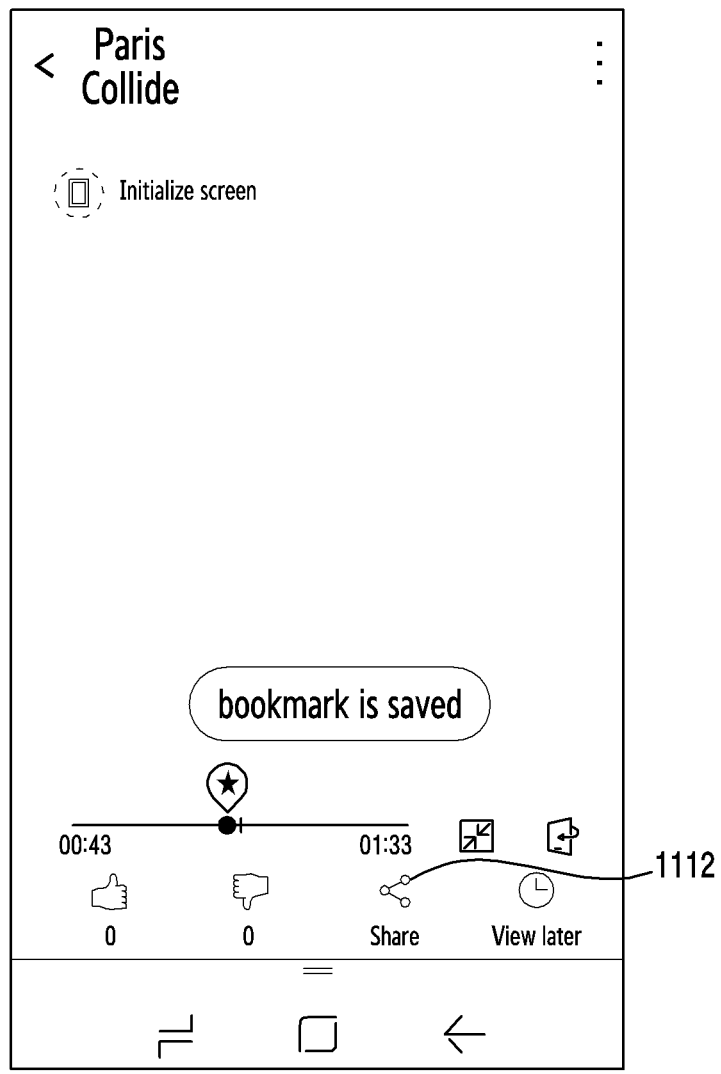
FIG. 11G illustrates a method of generating a bookmark and link content according to an embodiment of the disclosure.
Figure 11H:
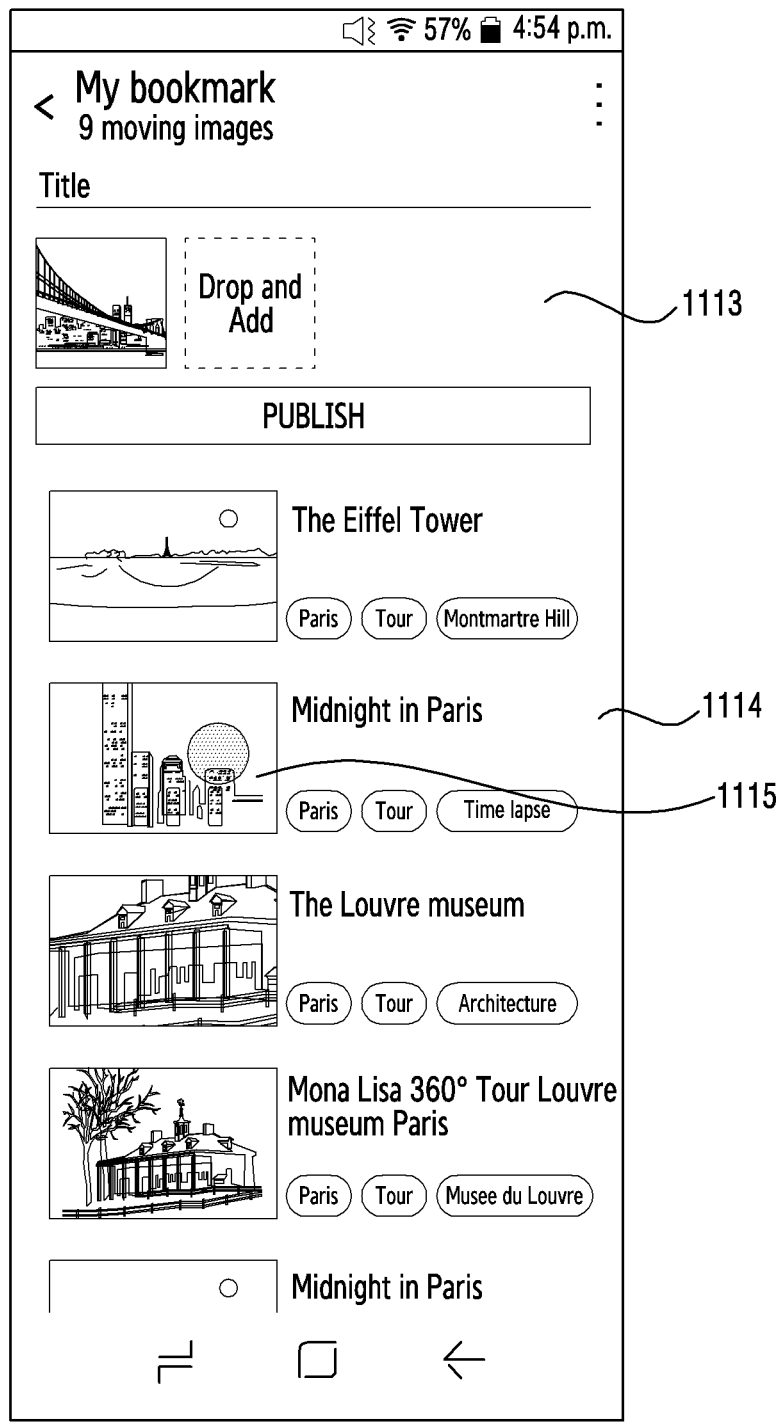
FIG. 11H illustrates a method of generating a bookmark and link content according to an embodiment of the disclosure.
Figure 11I:
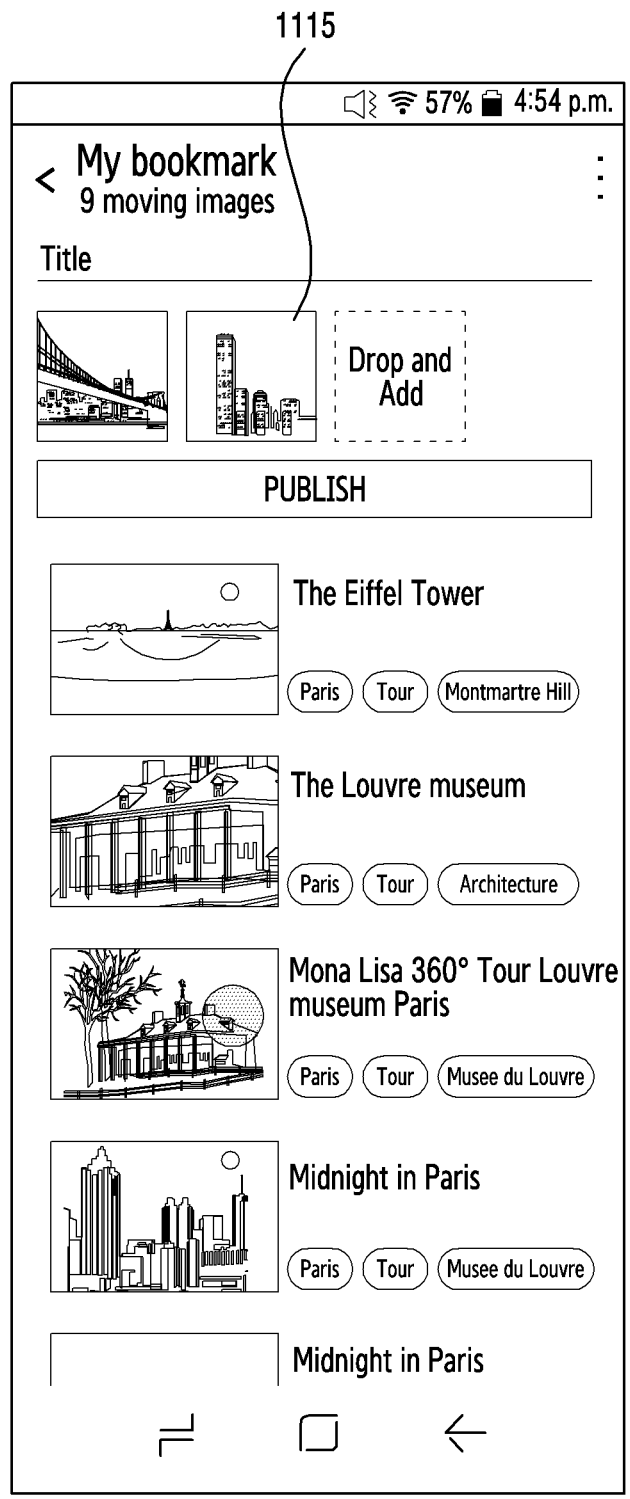
FIG. 11I illustrates a method of generating a bookmark and link content according to an embodiment of the disclosure.
Figure 11J:
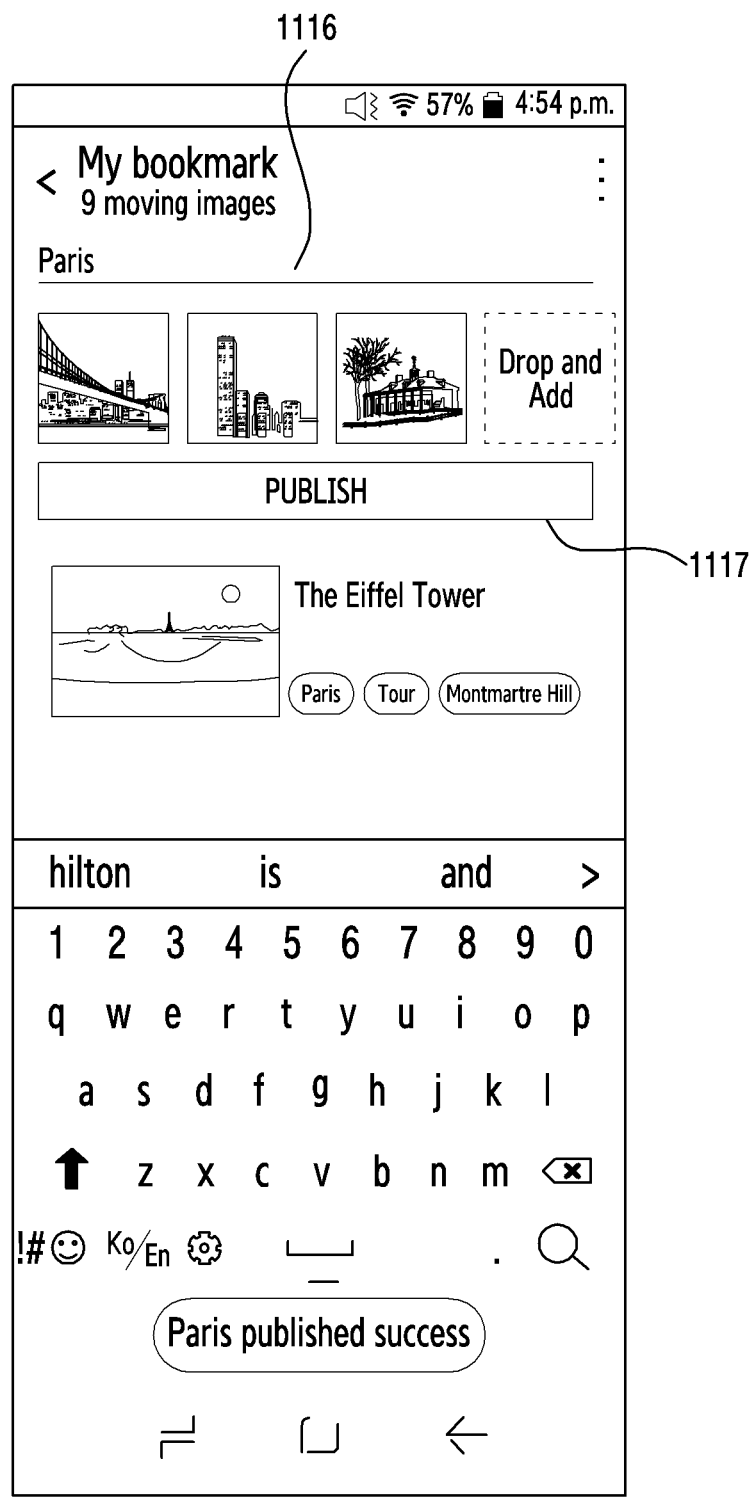
FIG. 11J illustrates a method of generating a bookmark and link content according to an embodiment of the disclosure.

FIG. 11A illustrates a method of generating a bookmark and link content according to an embodiment of the disclosure, FIG. 11B illustrates a method of generating a bookmark and link content according to an embodiment of the disclosure, FIG. 11C illustrates a method of generating a bookmark and link content according to an embodiment of the disclosure, FIG. 11D illustrates a method of generating a bookmark and link content according to an embodiment of the disclosure, FIG. 11E illustrates a method of generating a bookmark and link content according to an embodiment of the disclosure, FIG. 11F illustrates a method of generating a bookmark and link content according to an embodiment of the disclosure, FIG. 11G illustrates a method of generating a bookmark and link content according to an embodiment of the disclosure, FIG. 11H illustrates a method of generating a bookmark and link content according to an embodiment of the disclosure, FIG. 11I illustrates a method of generating a bookmark and link content according to an embodiment of the disclosure, and FIG. 11J illustrates a method of generating a bookmark and link content according to an embodiment of the disclosure.

Prior to a detailed description, FIGS. 8A to 8D illustrate that a virtual reality device generates a bookmark, FIGS. 11A to 11G illustrates that a smartphone generates a bookmark, and FIGS. 11H to 11J illustrate that a smartphone generates link content.

Referring to FIGS. 11A to 11J, an electronic device (for example, the electronic device 101, the electronic device 201, the electronic device 401, the electronic device 501, or the electronic device 601) according to an embodiment of the disclosure may display a home screen as illustrated in FIG. 11A. The home screen may include a content service app 1101.

When the content service app 1101 is selected (for example, touched), the electronic device may access a content provision server (for example, the server 108, the server 208, the server 408, the server 508, or the server 608) and display a content service screen as illustrated in FIG. 11B. Thereafter, the electronic device may receive a search result corresponding to a search word (for example, Paris) input into a search field 1102 from the server and display the search result.

When one piece of content 1103 is selected from the search result, the electronic device may receive the content 1103 from the server in a streaming manner and reproduce the content 1103 as illustrated in FIG. 11C. The content 1103 may be a three-dimensional image (or a 360-degree image) captured through a 360-degree camera. The reproduction screen may be a portion of the 360-degree image, and another portion may be displayed in response to movement of the electronic device.

When a bookmark setting command is input while the content 1103 is reproduced, the electronic device may control the display to display a bookmark setting UI as illustrated in FIG. 11C. For example, the bookmark setting UI may include a recommended tag 1104, a reproduction bar 1105 for setting a start point and an end point, a storage menu 1106, and a cancel menu 1107.

When one 1108a of the recommended tags is selected, the electronic device may input the selected tag 1108a as additional information 1108b as illustrated in FIGS. 11C and 11D.

When a tag addition icon 1109 is selected, the electronic device may control the display to display a tag input screen into which the user can manually input a tag as illustrated in FIG. 11E. When the user inputs a word into a tag input field 1110, the electronic device may provide a recommended tag on the basis of the corresponding word.

When the user completely inputs the tag (for example, when one of provided tags or search records is selected), the electronic device may provide a tag 1111 selected by the user as the recommended tag as illustrated in FIG. 11F.

When the storage menu 1106 is input, the electronic device may store a bookmark as illustrated in FIG. 11G. The storage menu 1106 may be changed to a sharing menu 1112.

When a request for displaying a bookmark list is made, the electronic device may control the display to display a bookmark list screen. The bookmark list screen may include a link content generation area 1113 and a list area 1114 as illustrated in FIG. 11H.

When at least one bookmark is selected in the list area 1114, the electronic device may move a selected bookmark 1115 to the link content generation area 1113 as illustrated in FIGS. 11H and 11I.

When the user inputs a title into a title field 1116 and then inputs the link content generation menu 1117, the electronic device may generate and store link content as illustrated in FIG. 11J.

Figure 12A:
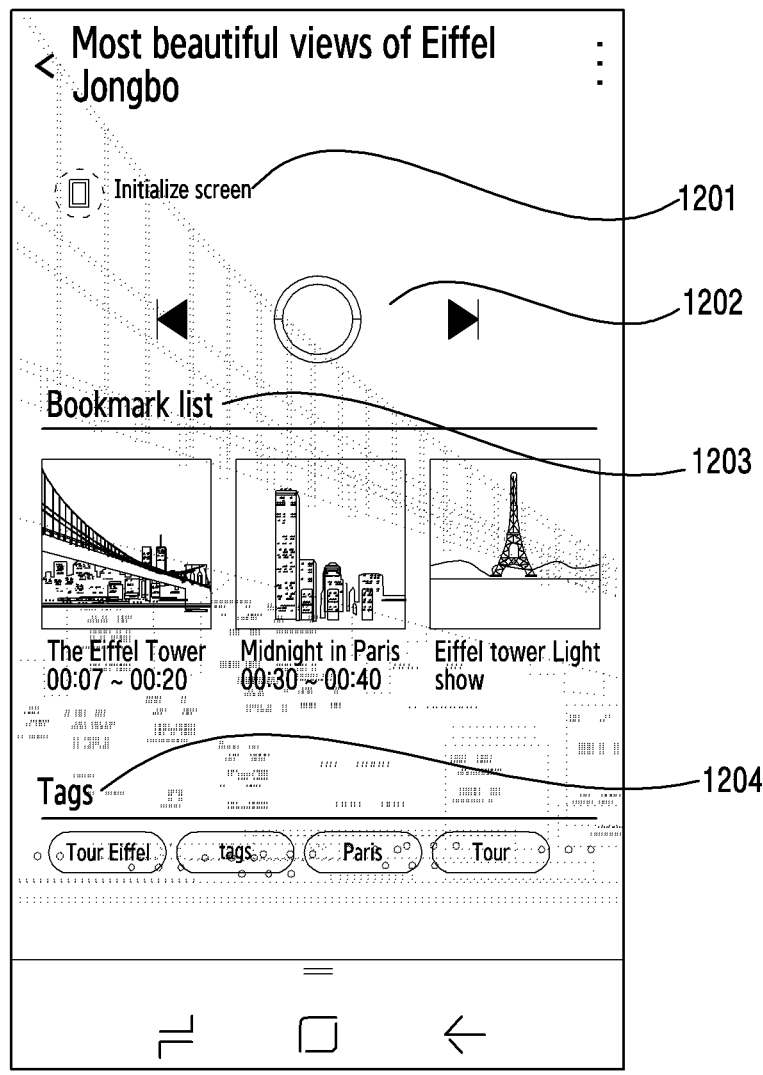
FIG. 12A illustrates a link content generation method according to an embodiment of the disclosure.
Figure 12B:
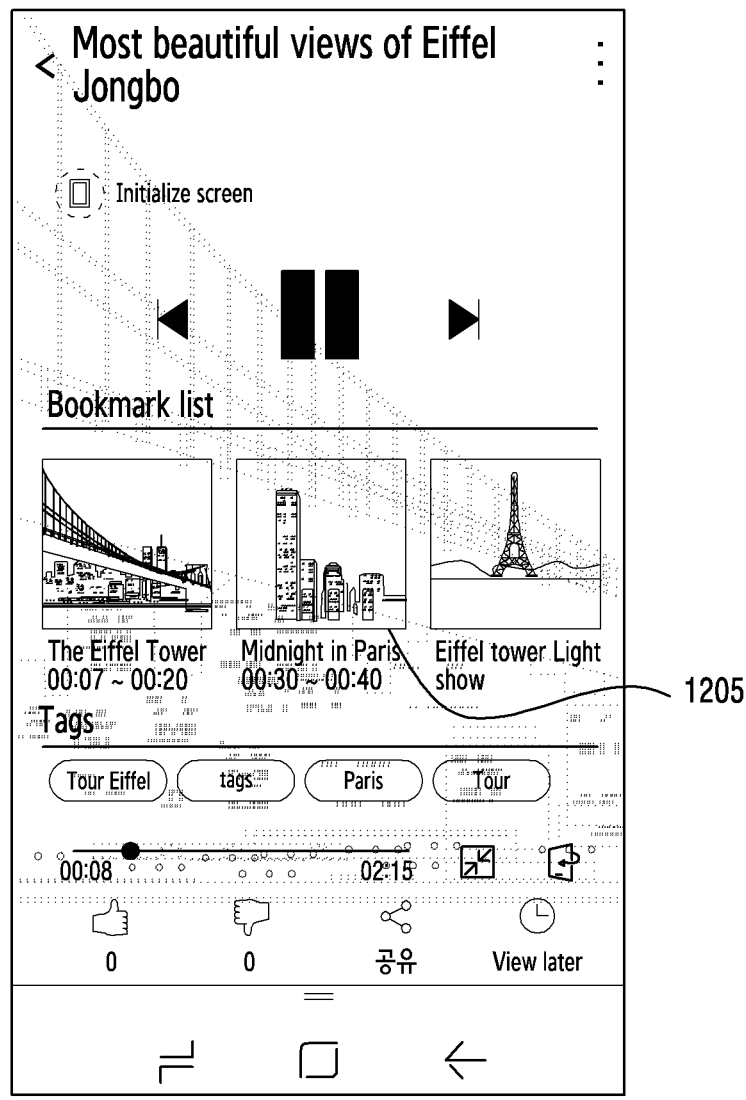
FIG. 12B illustrates a link content generation method according to an embodiment of the disclosure.
Figure 12C:
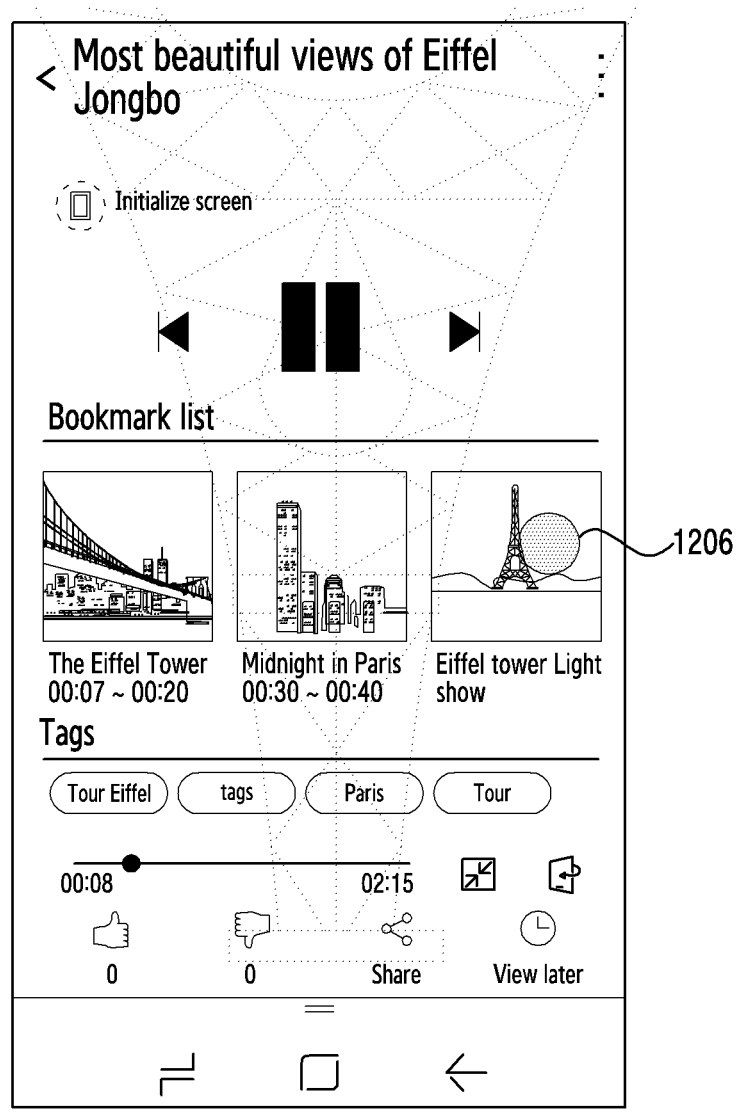
FIG. 12C illustrates a link content generation method according to an embodiment of the disclosure.

FIG. 12A illustrates a link content generation method according to an embodiment of the disclosure, FIG. 12B illustrates a link content generation method according to an embodiment of the disclosure, and FIG. 12C illustrates a link content generation method according to an embodiment of the disclosure.

Referring to FIGS. 12A to 12C, when a request for reproducing link content is made, an electronic device (for example, the electronic device 101, the electronic device 201, the electronic device 401, the electronic device 501, or the electronic device 601) according to an embodiment of the disclosure may output a reproduction screen of the link content on the display. For example, the electronic device may load (or buffer) a first bookmark image among a plurality of bookmark images included in the link content for a predetermined time and then reproduce the first bookmark image as illustrated in FIG. 12A. The electronic device may perform control to extract viewpoint information from additional information of the first bookmark and reproduce a location corresponding to first viewpoint information (for example, yaw) among the extracted viewpoint information. For example, when the extracted first viewpoint information is 30 degrees, the electronic device may reproduce an image at a location rotated 30 degrees in a yaw direction rather than a reference point (0 degrees) of a 360-degree image. At this time, second viewpoint information (for example, pitch) of the reproduced image may be the reference point (0 degrees). This is because, when reproduction is performed with rotation according to second viewpoint information, a reference axis (rotation axis) of the 360-degree image does not match a reference axis of the electronic device and thus the image is reproduced while inclining in a pitch direction.

According to an embodiment, when an image corresponding to second viewpoint information (for example, pitch) of the first bookmark image does not included in the current screen, the electronic device may display guide information (for example, an arrow icon and/or angle information) for inducing movement of the screen in the corresponding direction) on the screen. For example, when the second viewpoint information of the first bookmark image is 60 degrees and the electronic device may display the image from +30 degrees to −30 degrees from the reference point (for example, the center of the screen) in the pitch direction, the electronic device may display guide information indicating "Move 30 degrees or more in an upward direction" in an upper area.

The reproduction screen may include a screen initialization menu 1201, a reproduction control menu 1202, a bookmark list 1203, and tag information 1204. The screen initialization menu 1201, the reproduction control menu 1202, the bookmark list 1203, and the tag information 1204 may be displayed to be overlaid on the reproduction screen, and may be removed if there is no input for a predetermined time or longer.

When reproduction of the first bookmark image ends, the electronic device may reproduce a second bookmark image 1205 as illustrated in FIGS. 12B and 12C.

When a specific bookmark 1206 is selected from a bookmark list 1203, the electronic device may reproduce the selected bookmark 1206 as illustrated in FIG. 12C. The bookmark list 1203 can be scrolled (for example, scrolled from side to side).

According to various example embodiments of the present disclosure, a method of providing content by an electronic device (e.g., the electronic device (101), the electronic device (201), the electronic device (401), the electronic device (501), the electronic device (601)) may include: displaying a plurality of bookmarks stored in a memory (e.g., the memory (130)) on a display (e.g., the display device (160)); detecting selection of at least two bookmarks from the plurality of displayed bookmarks; and generating link content including the at least two selected bookmarks in response to a user input. Each of the plurality of bookmarks includes additional information containing information on some sections selected by a user while three-dimensional moving image content is reproduced and viewpoint information of the sections.

According to various example embodiments, the method may further include: providing at least one piece of recommended tag information, a recommended section, a recommended view angle, or recommended area information as recommended additional information, based on bookmark information of at least one other user related to three-dimensional moving image content being reproduced when a bookmark is generated or some sections selected as the bookmark; receiving recommended additional information from a predetermined server through a communication circuit and providing the recommended additional information; or updating recommended tag information, based on the added tag information and arranging recommended tag information having high correlation with the recommended tag information on the top of a list in response to additional of the tag information by a user.

According to various example embodiments, the link content may be generated to address information, section information, and the additional information of each of the at least two bookmarks.

According to various example embodiments, the method may further include sequentially reproducing images corresponding to the at least two bookmarks in response to a request for reproducing the link content.

According to various example embodiments, the three-dimensional moving image content may be a 360-degree image. The viewpoint information may include first viewpoint information and second viewpoint information. The reproducing of images may include extracting first viewpoint information from additional information of a first bookmark among the at least two bookmarks and adjusting a view angle of an image corresponding to the first bookmark to reproduce a location corresponding to the extracted first viewpoint information.

According to various example embodiments, the method may further include: acquiring second viewpoint information from at least one sensor included in the electronic device; and when the acquire second viewpoint information does not match second viewpoint information stored in the memory when the first bookmark is generated, displaying guide information for inducing movement of the view angle to match the second viewpoint information on the display.

According to certain embodiments of the disclosure, it is possible to generate and share one new image by connecting information on a plurality of sections without any complex procedure of cutting and synthesizing (for example, encoding) images. According to certain embodiments of the disclosure, connection information is stored and thus a separate storage space for storing image data may not be needed. According to certain embodiments of the disclosure, it is possible to improve a retention rate of content by easily generating various pieces of content according to a user's taste through the use of conventional content. According to certain embodiments of the disclosure, a search in units of sections or scenes can be performed using additional information on sections or scenes, and thus user's convenience can be improved.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain optional embodiments thereof, it will be understood by those skilled in the art that various changes in form and details may be made therein without departing from the disclosure as defined by the appended claims. Therefore, the disclosure is defined not by the detailed description of the disclosure but by the appended claims, and all differences will be construed as being included in the present disclosure.

What is claimed is:

1. An electronic device comprising:
   a display;
   a processor operatively connected to the display; and
   a memory operatively connected to the processor,
   wherein the memory stores instructions executable by the processor to cause the electronic device to:
   while playing at least one three-dimensional (3D) video, detect selections of a plurality of sections from the at least one 3D video,
   store each selected section as bookmarks in the memory, wherein each of the bookmarks comprises metadata indicating additional information on each of the selected sections, and viewpoint information indicating a viewing angle for each of the selected sections within the at least one 3D video,
   display the stored bookmarks on the display,
   in response to detecting selection of at least two bookmarks from among the displayed bookmarks, generate a link content by linking the at least two selected bookmarks such that images corresponding to the at least two selected bookmarks are sequentially played according to an order of the at least two selected bookmarks,
   wherein, during playback of a preceding bookmarked section of the generated link content, a next bookmarked section is requested for inclusion in the generated link content within a predetermined time prior to termination of the playback of the preceding bookmarked section, and
   wherein the link content comprises address information, the additional information and the viewpoint information of the 3D video corresponding to each of the at least two selected bookmarks.

2. The electronic device of claim 1, wherein the link content is generated by using the address information, section information and the additional information for the selected at least two bookmarks.

3. The electronic device of claim 1, wherein the instructions are executable by the processor to cause the electronic device to:
   display a recommendation including at least one of:
   other tag information storing text associated with the at least two bookmarks for the selected sections indicated by the at least two bookmarks,
   other section of the at least one 3D video associated with the at least two bookmarks for the selected sections indicated by the at least two bookmarks, and
   other viewing angle within the 3D video for viewing the selected sections,
   wherein the recommendation is based on a set of bookmarks for the 3D video associated with another user.

4. The electronic device of claim 3, wherein the instructions are executable by the processor to cause the electronic device to:
   when the tag information is included in the recommendation, update the tag information in response to detecting an input of additional textual information to be stored as new tag information, and
   display all tags included in the updated tag information as a list, wherein a tag having high correlation with the additional textual information is arrange on a top of the list.

5. The electronic device of claim 1, wherein the instructions are executable by the processor to cause the electronic device to:
   in response to detecting selection of the generated link content, initiate playback of the selected sections that are indicated by the at least two bookmarks,
   sequentially playing the selected selections.

6. The electronic device of claim 5, wherein the 3D video includes a 360-degree image, and the viewpoint information indicates a first viewing angle related to a first direction and a second viewing angle related to a second direction within the 360-degree image, and
   wherein the instructions are further executable by the processor to cause the electronic device to:
   when displaying the 360-degree image based on a first bookmark included in the generated link, set a current viewing angle according to the first viewing angle included in the viewpoint information.

7. The electronic device of claim 6, wherein the instructions are further executable to cause the processor to display a visual guide providing instructions directing adjustment from the first viewing angle to the second viewing angle included in the viewpoint information.

8. The electronic device of claim 5, wherein playback of the selected sections is executed by streaming, and wherein the instructions are further executable by the processor to cause the electronic device to:
   at the predetermined time prior to termination of playback of a current bookmarked section of the 3D video, generate a request for data of a next bookmarked section of the 3D video indicated by the at least two bookmarks, and
   buffer the requested data of the next bookmarked section of the 3D video.

9. The electronic device of claim 8, wherein the instructions are executable by the processor to cause the electronic device to:
- at the predetermined time prior to the termination of the playback of the current bookmarked section of the 3D video, display a selectable indicator,
- when the indicator is selected, play a remaining portion, consecutive to the current bookmarked section, of a 3D video corresponding to the current bookmarked section upon conclusion of the playback of the current bookmarked section, and
- when the indicator is unselected, initiating playback of the next bookmarked section upon conclusion of the playback of the current bookmarked section.

10. The electronic device of claim 5, wherein when a first section concludes, a fade-out visual effect is applied to the first section and a fade-in visual effect is applied to display and initiating of playback of a second section.

11. The electronic device of claim 5, wherein the instructions are executable by the processor to cause the electronic device to:
- control the display to display a control user interface including a menu area displaying at least one menu item selectable to control playback of the selected sections indicated by the at least two bookmarks included in the link content, a bookmark list area displaying a list including the at least two bookmarks included in the link content, and an information area displaying the additional information,
- wherein, when the link content is selected for playback, the control user interface is overlaid on the playback of the selected sections in response to detecting an input.

12. The electronic device of claim 5, wherein the instructions are executable by the processor to cause the electronic device to: display the additional information with the playback of the selected sections of the at least one 3D video, and
- in response to detecting selection of the displayed additional information, display at least one of a link content and a bookmarked section that is related to the link content and the at least two bookmarks indicating the selected sections of the at least one 3D video.

13. An electronic device, comprising:
a display;
a processor operatively connected to the display; and
a memory operatively connected to the processor,
wherein the memory stores instructions executable by the processor to cause the electronic device to:
- store, in the memory, a link content generated by linking at least two bookmarks such that images corresponding to the at least two bookmarks are sequentially played according to an order of the at least two bookmarks, each bookmark indicating a respective section of at least one three-dimensional (3D) video, each bookmark further including additional information on the respective section, and viewpoint information indicating a viewing angle for the respective section of the at least one 3D video, wherein the link content comprises address information and the additional information of the 3D video corresponding to each of the at least two bookmarks,
- receive a request to initiate playback of the link content,
- in response to the request, extract a first viewing angle defining a first FOV related to a first direction from a first bookmark of the at least two bookmarks included in the link content, and
- execute the playback of the link content by setting the extracted first viewing angle defining the first FOV as a present viewing angle, and initiating playback of the 3D video at a first section indicated by the address information corresponding to the first bookmark,
- wherein, during playback of a preceding bookmarked section of the generated link content, a next bookmarked section is requested for inclusion in the generated link content within a predetermined time prior to termination of the playback of the preceding bookmarked section.

14. The electronic device of claim 13, further comprising at least one sensor configured to detect a present viewing angle related to a second direction, wherein the instructions are executable by the processor to cause the electronic device to:
- detect the present viewing angle using the at least one sensor, and
- when the present viewing angle does not match a second viewing angle, related to the second direction, that is stored in the memory at a time at which the first bookmark is generated, display a visual guide directing adjustment from the present viewing angle to the second viewing angle.

15. A method of an electronic device, the method comprising:
- while playing, on a display, at least one three-dimensional (3D) video, detecting selections of a plurality of sections from the at least one 3D video;
- storing each selected sections as bookmarks in a memory, wherein each of the bookmarks comprises metadata indicating additional information on each of the selected sections, and viewpoint information indicating a viewing angle for each of the selected sections within the at least one 3D video;
- displaying the stored bookmarks on the display; and
- in response to detecting selection, by input circuitry, of at least two bookmarks from among the displayed bookmarks, generate a link content by linking the at least two selected bookmarks such that images corresponding to the at least two selected bookmarks are sequentially played according to an order of the at least two selected bookmarks,
- wherein, during playback of a preceding bookmarked section of the generated link content, a next bookmarked section is requested for inclusion in the generated link content within a predetermined time prior to termination of the playback of the preceding bookmarked section, and
- wherein the link content comprises address information, the additional information and the viewpoint information of the 3D video corresponding to each of the at least two selected bookmarks.

16. The method of claim 15, wherein the method further comprising:
- display a recommendation including at least one of:
  - other tag information storing text associated with the at least two bookmarks for the selected sections indicated by the at least two bookmarks,
  - other section of the at least one 3D video associated with the at least two bookmarks for the selected sections indicated by the at least two bookmarks, and
  - other viewing angle within the 3D video for viewing the selected sections, wherein the recommendation is based on a set of bookmarks for the 3D video associated with another user;
- when the tag information is included in the recommendation, update the tag information in response to detecting an input of additional textual information to be stored as new tag information; and display all tags included in the updated tag information as a list, wherein a tag having high correlation with the additional textual information is arrange on a top of the list.

17. The method of claim 15, wherein generating the link content comprises generating the link content using the address information, section information and the additional information for the at least two selected bookmarks.

18. The method of claim 15, further comprising:

in response to detecting selection of the generated link content, initiate playback of the selected sections that are indicated by the at least two bookmarks; and sequentially playing the selected sections.

19. The method of claim 18, wherein the 3D video includes a 360-degree image, and the viewpoint information indicates a first viewing angle related to a first direction and a second viewing angle related to a second direction within the 360-degree image, and wherein the method further comprises: when displaying the 360-degree image based on a first bookmark included in the generated link, setting a current viewing angle according to the first viewing angle included in the viewpoint information.

20. The method of claim 19, further comprising:

detecting a present viewing angle related to the second direction using at least one sensor of the electronic device; and when the present viewing angle does not match the second viewing angle that is stored in the memory at a time at which the first bookmark is generated, displaying a visual guide directing adjustment from the present viewing angle to the second viewing angle.

* * * * *